United States Patent
Bleyer

(10) Patent No.: US 9,624,873 B2
(45) Date of Patent: Apr. 18, 2017

(54) FUEL SUPPLY SYSTEM WITH LEAKAGE DETECTION MEANS

(75) Inventor: Benjamin Bleyer, Kiel (DE)

(73) Assignee: Caterpillar Motoren GmbH & Co. KG, Kiel (DE)

( * ) Notice: Subject to any disclaimer, the term of this patent is extended or adjusted under 35 U.S.C. 154(b) by 401 days.

(21) Appl. No.: 14/355,908

(22) PCT Filed: Aug. 21, 2012

(86) PCT No.: PCT/EP2012/003544
§ 371 (c)(1),
(2), (4) Date: May 13, 2014

(87) PCT Pub. No.: WO2013/064197
PCT Pub. Date: May 10, 2013

(65) Prior Publication Data
US 2014/0283788 A1    Sep. 25, 2014

(30) Foreign Application Priority Data
Nov. 4, 2011    (EP) .................................... 11187935

(51) Int. Cl.
*F02M 33/02*    (2006.01)
*F02M 25/00*    (2006.01)
(Continued)

(52) U.S. Cl.
CPC ........... *F02M 25/00* (2013.01); *F02D 19/025* (2013.01); *F02D 19/027* (2013.01); *F02D 41/22* (2013.01);
(Continued)

(58) Field of Classification Search
CPC .......................... F02D 19/0621; F02D 41/0037
(Continued)

(56) References Cited

U.S. PATENT DOCUMENTS 5,347,971 A * 9/1994 Kobayashi ......... F02M 25/0809
                                                                123/198 D
5,806,480 A    9/1998 Maeda et al.
(Continued)

FOREIGN PATENT DOCUMENTS

CN    1225708    8/1999
CN    1526938    9/2004
(Continued)

OTHER PUBLICATIONS

English-language International Search Report from European Patent Office for International Application No. PCT/EP2012/003544, maiied Oct. 22, 2012.
(Continued)

*Primary Examiner* — John Kwon

(57) ABSTRACT

A method is provided for detecting a leakage in a fuel supply system of an internal combustion engine. The fuel supply system includes a fuel line system with fuel line sections and a pressure monitoring system with monitoring segments, a set of valves, and a pressure sensor. The method includes detecting a leakage between the fuel line sections and the pressure monitoring system when the set of valves are opened to fluidly connect the monitoring segments. The method also includes performing at least two pressure measurements for at least two selected sets of neighboring monitoring segments for providing pressure behavior information for the selected sets of neighboring monitoring segments. The method further includes comparing the pressure behavior information of the selected sets of neighboring monitoring segments, and identifying a leaking monitoring segment based on the comparison.

18 Claims, 13 Drawing Sheets

(51) Int. Cl.
    *F02D 41/22*     (2006.01)
    *F02M 55/02*     (2006.01)
    *F02M 21/02*     (2006.01)
    *F02M 61/16*     (2006.01)
    *F02D 19/02*     (2006.01)

(52) U.S. Cl.
CPC .... *F02M 21/0245* (2013.01); *F02M 21/0293* (2013.01); *F02M 55/025* (2013.01); *F02M 61/167* (2013.01); F02D 2041/225 (2013.01); F02D 2200/0602 (2013.01); F02M 2700/05 (2013.01); Y02T 10/32 (2013.01); Y02T 10/36 (2013.01)

(58) Field of Classification Search
USPC ............... 123/520, 198 D, 479; 137/565.22; 73/114.42
See application file for complete search history.

(56) References Cited

U.S. PATENT DOCUMENTS

| | | | |
|---|---|---|---|
| 5,868,111 | A | 2/1999 | Augustin |
| 6,192,742 | B1 | 2/2001 | Miwa et al. |
| 6,827,065 | B2 | 12/2004 | Gottemoller et al. |
| 7,475,674 | B2 | 1/2009 | Marksteiner et al. |
| 2005/0127670 | A1 | 6/2005 | Huber |
| 2005/0133097 | A1* | 6/2005 | Mitani ............... F02M 25/0818 137/565.22 |
| 2005/0166899 | A1 | 8/2005 | Shamine et al. |
| 2006/0130560 | A1 | 6/2006 | Shamine |
| 2010/0126250 | A1 | 5/2010 | Jax |

FOREIGN PATENT DOCUMENTS

| | | |
|---|---|---|
| CN | 1637267 | 7/2005 |
| CN | 101876274 | 3/2010 |
| DE | 7 147 848 | 8/1972 |
| DE | 32 13 821 | 10/1983 |
| DE | G 93 05 494.7 | 7/1993 |
| DE | 43 44 190 | 6/1995 |
| DE | 44 35 718 | 4/1996 |
| DE | 195 25 176 | 1/1997 |
| DE | 197 06 694 | 9/1998 |
| DE | 10 197 54 353 | 6/1999 |
| DE | 198 33 390 | 1/2000 |
| DE | 102 45 389 | 4/2004 |
| DE | 10 2004 041 153 | 5/2005 |
| DE | 10 2005 000 638 | 8/2005 |
| DE | 10 2004 055 575 | 5/2006 |
| DE | 10 2005 012 165 | 9/2006 |
| DE | 60 2004 001 418 | 6/2007 |
| DE | 10 2008 029 224 | 12/2008 |
| DE | 20 2008 011 775 | 12/2008 |
| DE | 10 2008 015 611 | 10/2009 |
| DE | 10 2009 014 796 | 9/2010 |
| EP | 0 492 129 | 7/1992 |
| EP | 1 150 006 | 10/2001 |
| EP | 1 234 966 | 8/2002 |
| EP | 2 011 996 | 1/2009 |
| FR | 1.008.357 | 5/1952 |
| JP | 2004-300997 | 10/2004 |
| WO | WO 2009/003717 | 1/2009 |

OTHER PUBLICATIONS

English-language European Search Report from the Munich Patent Office for EP 11 18 7935, date of completion of search Apr. 12, 2012,.

* cited by examiner

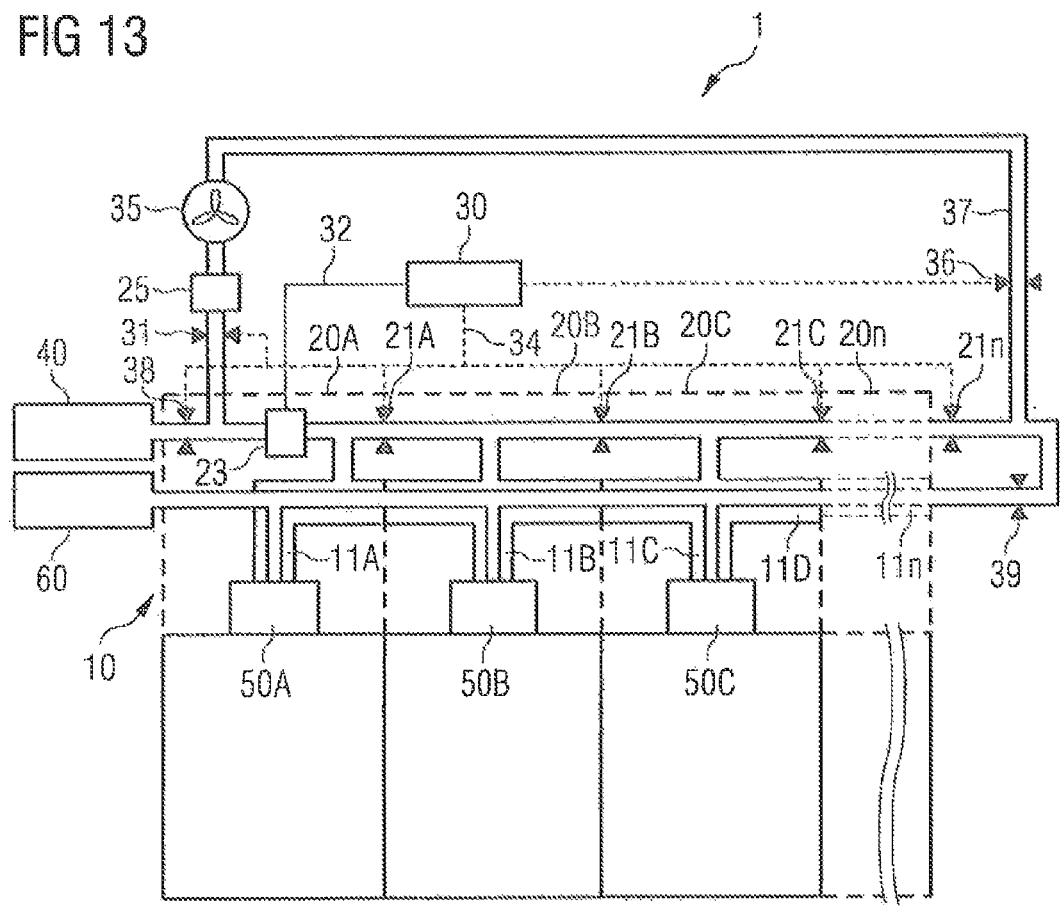

FUEL SUPPLY SYSTEM WITH LEAKAGE DETECTION MEANS

CLAIM FOR PRIORITY

This application is a U.S. national phase entry under 35 U.S.C. §371 from PCT International Application No. PCT/EP2012/003544, filed Aug. 21, 2012, which claims benefit of priority of European Patent Application No. 11187935.9 filed Nov. 4, 2011, the subject matter of both of which is incorporated herein by reference.

TECHNICAL FIELD

The present disclosure generally relates to a method for detecting a leakage in a fuel supply system and, particularly, leakage detection in a double-walled fuel supply pipe system configured selectively to supply fuel such as gas or liquid fuel, for example diesel fuel, to an internal combustion engine.

Furthermore, the present disclosure relates to a fuel supply system.

BACKGROUND

Fuel supply systems which are used particularly in gas or dual-fuel engines may be specifically designed due to security purposes. For example, double-walled or multi-walled configurations may be applied to all gas supplying components to be used in gas or dual-fuel engines. Double-walled fuel supply systems may be used on ships or vessels where gas or dual-fuel engines may be operated. The same applies to gas or dual-fuel engines used to generate electric power.

Double-walled fuel supply systems may be configured such that fuel may be piped from a first place to a second place within an inner pipe surrounded by an outer pipe. Double-walled configurations of fuel supply systems may be used to prevent leakage of gas into the atmosphere in case of damage to the inner pipe of the fuel supply system.

In case of a leakage in a double-walled fuel supply system, it is necessary to localize the leakage to facilitate repair.

DE 195 25 176 A1 shows a double-walled fuel supply pipe system having local leakage detection means. In particular, the double-walled fuel supply pipe system is divided into a plurality of sections, and the space between the inner and outer walls of each section is connected to a separate inert gas feed line in order to be filled with high pressure inert gas. Each of the feed lines is provided with a pressure controller, a magnetic valve and a sensor. Leakage detection in each of the sections is carried out by periodically closing all the magnet valves, except for the magnet valve of the section to be monitored, and monitoring whether the pressure decreases or not. A pressure decrease may be indicative of a leakage in that respective section.

DE 10 2008 015 611 A1 shows a double-walled fuel supply pipe system for a combustion engine having local leakage detection means. In particular, an outer pipe of a double-walled high pressure fuel line is divided into a plurality of sections, each of the sections being provided with a leakage detection device having a first and a second position. In the first position, a connection between the outer pipes of each of the sections is established. In the second position, a connection between an outer pipe of a section and the outside of the double-walled fuel supply pipe system is established for detecting whether fuel is escaping or not. Escape of fuel may be indicative of a leakage in the respective section.

The present disclosure is directed, at least in part, to improving or overcoming one or more aspects of the prior systems.

SUMMARY OF THE DISCLOSURE

In one aspect of the present disclosure, a method for detecting a leaking fuel line section in a fuel supply system of an internal combustion engine, wherein the fuel supply system comprises a fuel line system with fuel line sections, a pressure monitoring system with monitoring segments associated to the fuel line sections, a set of valves for fluidly separating neighbouring ones of the monitoring segments, and a pressure sensor connected to one of the monitoring segments, may comprise the following steps:

detecting a leakage between the fuel line sections and the pressure monitoring system having the set of valves opened to fluidly connect the monitoring segments; performing a sequence of pressure measurements for differing sets of the monitoring segments being fluidly connected to the pressure sensor, wherein the sequence comprises activating a first valve of the set of valves, thereby providing a first separation of the monitoring segments into a first pressure monitored subset of the monitoring segments fluidly connected with the pressure sensor and a first remote subset of the monitoring segments fluidly disconnected from the pressure sensor; monitoring the pressure within the first pressure monitored subset of the monitoring segments, thereby, in dependence of detecting a continued changing of the pressure or a constant pressure, associating the first pressure monitored subset of the monitoring segments or the first remote subset of the monitoring segments to include the leaking fuel line section;

activating a second valve of the set of valves such that the subset of monitoring segments including the leaking fuel line section is reduced by at least one monitoring segment, thereby providing a second separation of the monitoring segments into a second pressure monitored subset fluidly connected with the pressure sensor and a second remote subset fluidly disconnected from the pressure sensor; monitoring the pressure within the second pressure monitored subset of the monitoring segments, thereby, in dependence of the detected pressure behaviour, identifying the leaking fuel line section.

In other words, in the above described method, in case a leakage is detected, for example all valves of the inert gas supply pipe system may be closed such that only a first fuel supply pipe section is connected to the pressure sensor and the pressure in the outer pipe of the first fuel supply pipe section may be monitored. In case of no pressure drop in the outer pipe of the first fuel supply pipe section, a first one of the valves of the inert gas supply pipe system may be opened such that the first fuel supply pipe section and a subsequent second fuel supply pipe section are connected to the pressure sensor. Again, the pressure in the first and the second fuel supply pipe sections may be monitored. In case of no pressure drop in the first and the second fuel supply pipe sections, the steps of opening a further one of the valves of the inert gas supply line system and monitoring the pressure in the corresponding fuel supply pipe section and the fuel supply pipe sections already connected to the pressure sensor may be repeated until a pressure deviation is detected.

In a further aspect of the present disclosure, a fuel supply system for an internal combustion engine may comprise a fuel line system with fuel line sections and a pressure monitoring system with monitoring segments associated to the fuel line sections, a set of valves for fluidly separating neighbouring monitoring segments and a pressure sensor connected fluidly to one of the monitoring segments. The pressure monitoring system may be configured to connect selectively and fluidly various sets of monitoring segments to the pressure sensor.

In another aspect of the present disclosure, a method for detecting a leaking fuel line section in a fuel supply system of an internal combustion engine, wherein the fuel supply system comprises a fuel line system with fuel line sections, a pressure monitoring system with monitoring segments associated to the fuel line sections, a set of valves for fluidly separating neighbouring ones of the monitoring segments, and a pressure sensor connected to one of the monitoring segments, may comprise the following steps: monitoring a pressure within the pressure monitoring system having the set of valves opened, thereby fluidly connecting the monitoring segments; detecting a changing of the pressure caused by a leakage between the leaking fuel line section and the pressure monitoring system; performing a sequence of pressure measurements for differing sets of the monitoring segments being fluidly connected to the pressure sensor, wherein the sequence comprises activating a first valve of the set of valves, thereby providing a first separation of the monitoring segments into a first pressure monitored subset of the monitoring segments fluidly connected with the pressure sensor and a first remote subset of the monitoring segments fluidly disconnected from the pressure sensor; monitoring the pressure within the first pressure monitored subset of the monitoring segments, thereby, in dependence of detecting a continued changing of the pressure or a constant pressure, associating the first pressure monitored subset of the monitoring segments or the first remote subset of the monitoring segments to include the leaking fuel line section; activating a second valve of the set of valves such that the subset of monitoring segments including the leaking fuel line section is reduced by at least one monitoring segment, thereby providing a second separation of the monitoring segments into a second pressure monitored subset fluidly connected with the pressure sensor and a second remote subset fluidly disconnected from the pressure sensor; monitoring the pressure within the second pressure monitored subset of the monitoring segments, thereby, in dependence of the detected pressure behaviour, identifying the leaking fuel line section.

In other words, in the above described method, in case the pressure sensor detects a pressure drop, for example all valves of the inert gas supply pipe system may be closed such that only a first fuel supply pipe section is connected to the pressure sensor and the pressure in the outer pipe of the first fuel supply pipe section may be monitored. In case of no pressure drop in the outer pipe of the first fuel supply pipe section, a first one of the valves of the inert gas supply pipe system may be opened such that the first fuel supply pipe section and a subsequent second fuel supply pipe section are connected to the pressure sensor. Again, the pressure in the first and the second fuel supply pipe sections may be monitored. In case of no pressure drop in the first and the second fuel supply pipe sections, the steps of opening a further one of the valves of the inert gas supply line system and monitoring the pressure in the corresponding fuel supply pipe section and the fuel supply pipe sections already connected to the pressure sensor may be repeated until a pressure deviation is detected.

Other features and aspects of this disclosure will be apparent from the following description and the accompanying drawings.

BRIEF DESCRIPTION OF THE DRAWINGS

FIG. 13 shows a schematic overview of an internal combustion engine having a fuel supply system according to the present disclosure.

DETAILED DESCRIPTION

Figure 1:
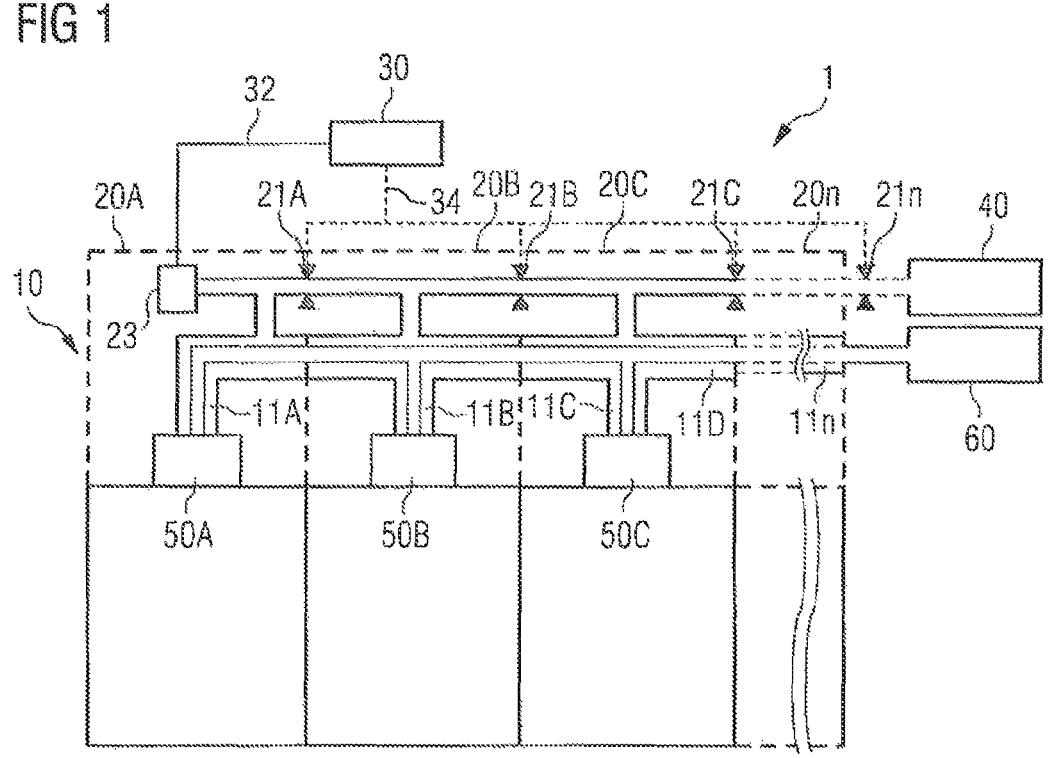
FIG. 1 shows a schematic overview of an internal combustion engine having a fuel supply system according to the present disclosure.

The following is a detailed description of exemplary embodiments of the present disclosure. The exemplary embodiments described therein and illustrated in the drawings are intended to teach the principles of the present disclosure, enabling those of ordinary skill in the art to implement and use the present disclosure in many different environments and for many different applications. Therefore, the exemplary embodiments are not intended to be, and should not be considered as, a limiting description of the scope of patent protection. Rather, the scope of patent protection shall be defined by the appended claims.

Referring to FIG. 1, an internal combustion engine 1 is shown. Internal combustion engine 1 may comprise a fuel supply system 10. Fuel supply system 10 may be configured selectively to supply fuel such as gas or liquid fuel, for example diesel fuel. Herein, the term "fuel" is used for any kind of gaseous fuel as well as for any kind of liquid fuel.

Fuel supply system 10 may comprise a fuel line system and a pressure monitoring system. Fuel line system may comprise a plurality of fuel line sections 11A, 11B, 11C, 11D, . . . , 11n. Pressure monitoring system may comprise a plurality of monitoring segments 20A, 20B, 20C, . . . , 20n.

Each of fuel line sections 11A, 11B, 11C, 11D, . . . , 11n may comprise a fuel inlet valve 50A, 50B, 50C, . . . . Further, fuel line sections 11A, 11B, 11C, 11D, . . . , 11n may be connected to each other such that they form a continuous inner fuel pipe line. The continuous inner fuel pipe line may be connected to a fuel reservoir 60.

Each of the plurality of monitoring segments 20A, 20B, 20C, . . . , 20n may be connected to each other such that they are dividable from a neighbouring one of the monitoring segments 20A, 20B, 20C, . . . , 20n by use of a respective valve 21A, 21B, 21C, . . . , 21n. One of monitoring segments 20A, 20B, 20C, . . . , 20n, for example 20n, may be connected to an inert gas reservoir 40. One of monitoring segments 20A, 20B, 20C, . . . , 20n, for example 20A, opposing the other one of monitoring segments 20A, 20B, 20C, . . . , 20n connected to inert gas reservoir 40, may be connected to a pressure sensor 23. Pressure sensor 23 may be connected to control unit 30 via a first control line 32.

Control unit 30 may be a single microprocessor or plural microprocessors that may include means for controlling, among others, operation of valves 21A, 21B, 21C, . . . , 21n via second control lines 34 as well as other components of internal combustion engine 1, for instance, it may indicate a leakage in fuel supply system 10 based on a corresponding output signal of pressure sensor 23. Control unit 30 may include all components required to run an application such as, for example, a memory, a secondary storage device, and a processor such as a central processing unit or any other means known in the art for controlling combustion engine 1 and its various components. Control unit 30 may analyze and compare received and stored data, and, based on instructions and data stored in the memory or input by a user, determine whether action is required. Control unit 30 may include any memory device known in the art for storing data relating to operation of combustion engine 1 and its components. The data may be stored in the form of one or more maps that describe and/or relate, for example, to operation of the valves 21A, 21B, 21C, . . . , 21n. Each of the maps may be in the form of tables, graphs, and/or equations, and may include a compilation of data collected from lab and/or field operation of combustion engine 1.

Figure 2:
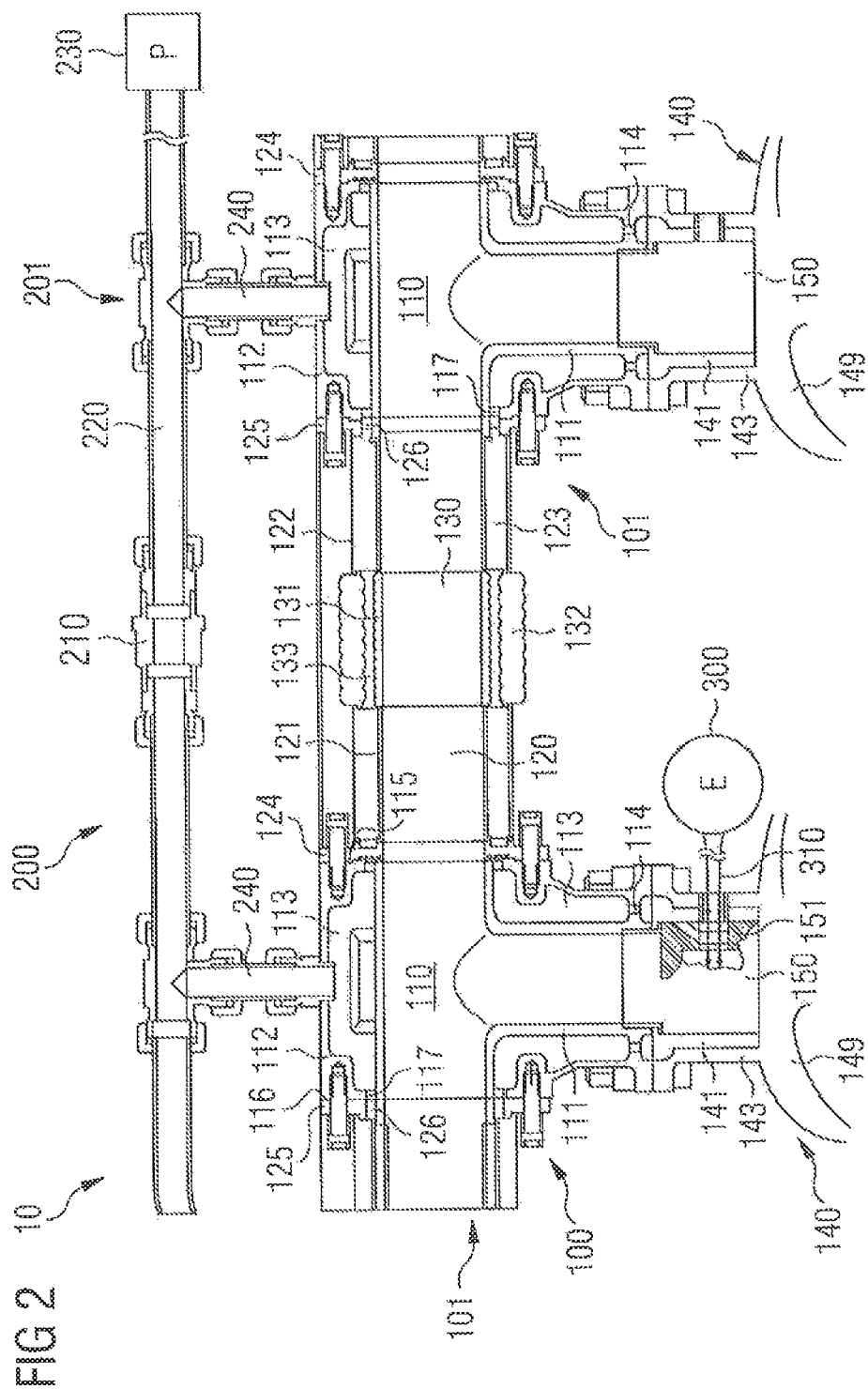
FIG. 2 shows a detailed cross-sectional view of a section of the fuel supply system of FIG. 1.

Referring to FIG. 2, fuel supply system 10 may comprise a fuel supply pipe system 100 and an inert gas supply pipe system 200. Fuel supply pipe system 100 may be configured selectively to supply fuel such as gas or liquid fuel, for example diesel fuel, to combustion units (not shown in FIG. 2).

Fuel supply pipe system 100 may have a plurality of fuel pipe sections 101. FIG. 2 shows only one complete fuel pipe section 101 connected to each of the neighbouring fuel pipe sections. Referring to FIG. 1, monitoring segments 20A, 20B, 20C, . . . , 20n may comprise inert gas supply pipe system 200 and part of fuel supply pipe system 100. Fuel line sections 11A, 11B, 11C, . . . , 11n may comprise the other part of fuel supply pipe system 100. Referring to FIG. 2, each of fuel pipe sections 101 may comprise two fuel supply pipe elements. Fuel supply pipe elements may be a T-shaped fuel supply pipe element 110 and a linear fuel supply pipe element 120 connected to each other by use of fastening means, for example screws or bolts. Alternatively, both of fuel supply pipe elements may be T-shaped or linearly shaped. T-shaped fuel supply pipe element 110 may have a linearly shaped section and a cylinder head section which may be arranged perpendicular to the linear section and which may be arranged at the side of a cylinder head in a mounted state. Fuel supply pipe elements 110, 120 may be made of metal.

Each of the T-shaped fuel supply pipe element 110 and the linear fuel supply pipe element 120 may comprise an inner pipe 111, 121 and an outer pipe 112, 122. Inner pipe 111, 121 and outer pipe 112, 122 may define a pipe element leakage detection space 113, 123 therebetween. Outer pipe 112, 122 may be arranged concentrically around inner pipe 111, 121. Alternatively, outer pipe 112, 122 may be eccentrically arranged around inner pipe 111, 121.

T-shaped fuel supply pipe element 110 may comprise a first end face element 115 and a second end face element 116, second end face element 116 opposing first end face element 115. First end face element 115 and second end face element 116 may be integrally formed with inner pipe 111. Alternatively, first end face element 115 and second end face element 116 may be integrally formed with outer pipe 112 or both inner pipe 111 and outer pipe 112. Further, first end face element 115 and second end face element 116 may be separately formed and connected to inner pipe 111 and/or outer pipe 112, for example by plug connection, press-fitting, bolts or screws, the latter being exemplarily shown in FIG. 2.

Linearly shaped fuel supply pipe element 120 may comprise a first end face element 124 and a second end face element 125, second end face element 125 opposing first end face element 124. First end face element 124 and second end face element 125 may be separately formed and connected to inner pipe 121 and outer pipe 122. As shown in FIG. 2, first end face element 124 and second end face element 125 may be connected to inner pipe 121 and outer pipe 122 by plug connection as exemplarily shown in FIG. 2. Alternatively, first end face element 124 and second end face element 125 may be connected to inner pipe 121 and/or outer pipe 122 by a bolt connection using at least one screw or bolt. Alternatively, first end face element 124 and second end face element 125 may be integrally formed with inner pipe and/or outer pipe 122.

Fuel supply pipe elements 120 may comprise a bellow element 130. Alternatively, none of the fuel supply pipe elements 110 or each of the fuel supply pipe elements 110, 120 may comprise a bellow element 130. Alternatively, fuel supply pipe element 110, 120 may have more than one bellow element 130. In case of more than one bellow element 130, the bellow-elements 130 may be equally spaced from each other and equally distributed in fuel supply pipe element 110, 120, respectively, or may be irregularly spaced from each other and irregularly distributed in fuel supply pipe elements 110, 120, respectively.

Bellow element 130 may comprise a plurality of kinks, for example six kinks. Further bellow element 130 may comprise an inner bellow 131 and an outer bellow 132. Inner bellow 131 and outer bellow 132 may define a bellow leakage detection space 133 there between. Outer bellow 132 may be concentrically arranged around inner bellow 131. Alternatively, outer bellow 132 may be eccentrically arranged around inner bellow 131. Leakage detection space 133 may be open at each of the ends of bellow element 130 such that, in an assembled state, it may be fluidly connected to leakage detection space 123. Alternatively, in case both fuel supply pipe elements 110, 120 comprise a bellow element 130, leakage detection space 133 may be fluidly connected to leakage detection spaces 113 and 123, respectively, in an assembled state. Bellow element 130 may be made of metal, such as stainless steel, for example, EN 10088-2-1.4301 or EN 10088-2-1.4571. Alternatively, a low priced steel may be used for bellow element 130. The length of bellow element 130 may be dependent on the length of fuel supply element 110, 120 and/or the number of bellow elements 130 provided in fuel supply element 130. For example, bellow element 130 may have a length between 40 mm and 100 mm, preferably around 50 mm, 80 mm or 90 mm.

Fuel supply system 10 may further comprise a cylinder head 140. Cylinder head 140 may comprise a cylinder head main body 149 and an inlet valve casing 143. Inlet valve casing 143 may be casted on cylinder head main body 149 and may have a cup-like shape with a substantially closed bottom portion, a side wall portion and an open upper portion. Side wall portion may have a circular cross-section in an up-and-down-direction in FIG. 2 or may have a polygonal cross-section in an up-and-down-direction in FIG. 2.

Inlet valve casing 143 may be made by integrally forming, for example casting, a boss on the one end of a mixing chamber of cylinder head 140. Casting the boss may be made by use of a core which is removed after the casting process. Inlet valve casing 143 may be connected to fuel supply pipe element 110, for example by use of screws or bolts such that open upper portion is directed to fuel supply pipe system side and substantially closed bottom portion is directed to combustion chamber side. Combustion chamber (not shown) may be connected to cylinder head 140. Additionally, inlet valve casing 143 may be connected to fuel supply pipe element 120.

As shown in FIG. 2, inlet valve casing 143 may house a fuel inlet valve 150. Fuel inlet valve 150 may comprise a valve housing 151. Fuel inlet valve may be connected to an external power source 300 via two cables 310. Alternatively, fuel inlet valve 150 may be connected to power source 300 via one or more than two cables 310. Cables 310 may run through valve housing 151 and inlet valve casing 143.

Inlet valve casing 143 may have a greater dimension, for example a larger cross-section as viewed in an up-and-down-direction in FIG. 2 than the cross-section of fuel inlet valve 150 such that inlet valve casing 143 and fuel inlet valve 150 define a casing leakage detection space 141 there between. Inlet valve casing 143 may be connected to fuel supply pipe element 110 in a manner that leakage detection space 141 is fluidly connected to leakage detection space 113. In case inlet valve casing 143 is connected to fuel supply pipe element 120, leakage detection space 141 may be fluidly connected to leakage detection space 123.

As shown in FIG. 2, inert gas supply pipe system 200 may comprise an inert gas supply pipe 220. Inert gas supply pipe 220 may be divided into a plurality of inert gas supply pipe sections by means of shut off valves 210. Inert gas supply pipe 220 may be fluidly connected to leakage detection space 113 of fuel supply pipe element 110 via tubular connecting parts 240. Alternatively, inert gas supply pipe 220 may be fluidly connected to leakage detection space 123 of fuel supply pipe element 120 or both to leakage detection space 113 of fuel supply pipe element 110 and leakage detection space 123 of fuel supply pipe element 120.

Fuel supply system 10 may further comprise a single pressure sensor 230. Pressure sensor 230 may be arranged at one end of inert gas supply pipe 220. Alternatively, pressure sensor 230 may be arranged else where at inert gas supply pipe 220. Pressure sensor 230 may be configured to detect a pressure deviation, in particular, a pressure drop in inert gas supply pipe 220. Pressure sensor 230 may be a silicium-, silica- or metal-based sensor. In addition, pressure sensor 230 may be made of or coated with a piezo-electric material.

Figure 3:
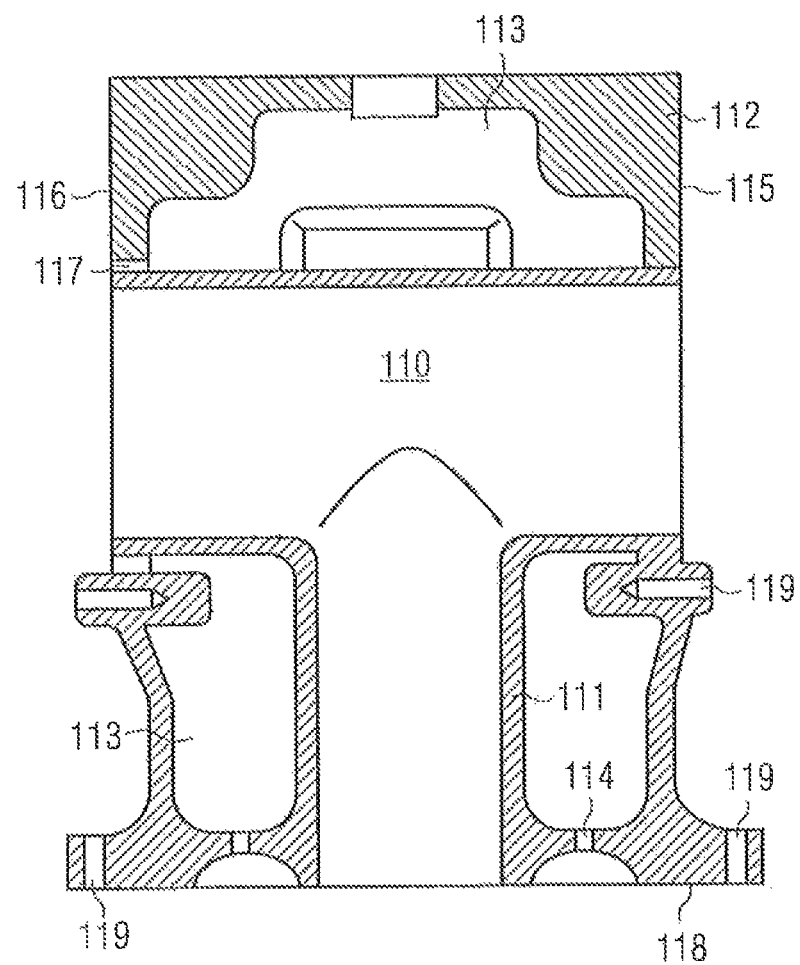
FIG. 3 shows a cross-sectional view of a fuel supply pipe element of the fuel supply system of FIG. 2 according to a first embodiment.

FIG. 3 shows a first embodiment of a fuel supply pipe element, namely fuel supply pipe element 110 being formed substantially T-shaped. In particular, as shown in FIG. 3, inner pipe 11 may be formed T-shaped.

In second end face 116, a pipe element leakage detection opening 117 may be formed. Pipe element leakage detection opening 117 may connect leakage detection space 113 to the outside of fuel supply pipe element 110 and in the mounted state to inert gas supply pipe 220. Alternatively, pipe element leakage detection opening 117 may be formed in first end face element 115.

Further, fuel supply pipe element 110 may have a third end face element 118. Third end face element may be arranged perpendicularly to first end face element 115 and second end face element 116. In particular, third end face element 118 may be arranged at a lower end of T-shaped fuel supply pipe element 110 as viewed in FIG. 3. Third end face element 118 may have a casing leakage detection opening 114. Casing leakage detection opening 114 may extend through third end face element 118 in an up-and-down-direction as viewed in FIG. 3. Casing leakage detection opening 114 may connect leakage detection space 113 to the outside of fuel supply pipe element 110.

Further, fuel supply pipe element 110 may have a plurality of fixing holes 119, for example eight fixing holes (only two fixing holes shown in FIG. 3, one fixing hole 119 on each left and right side of fuel supply element 110 as viewed in FIG. 3) for fixing a screw or the like, at first end face element 115, second end face element 116 and third end face element 118.

Figure 4:
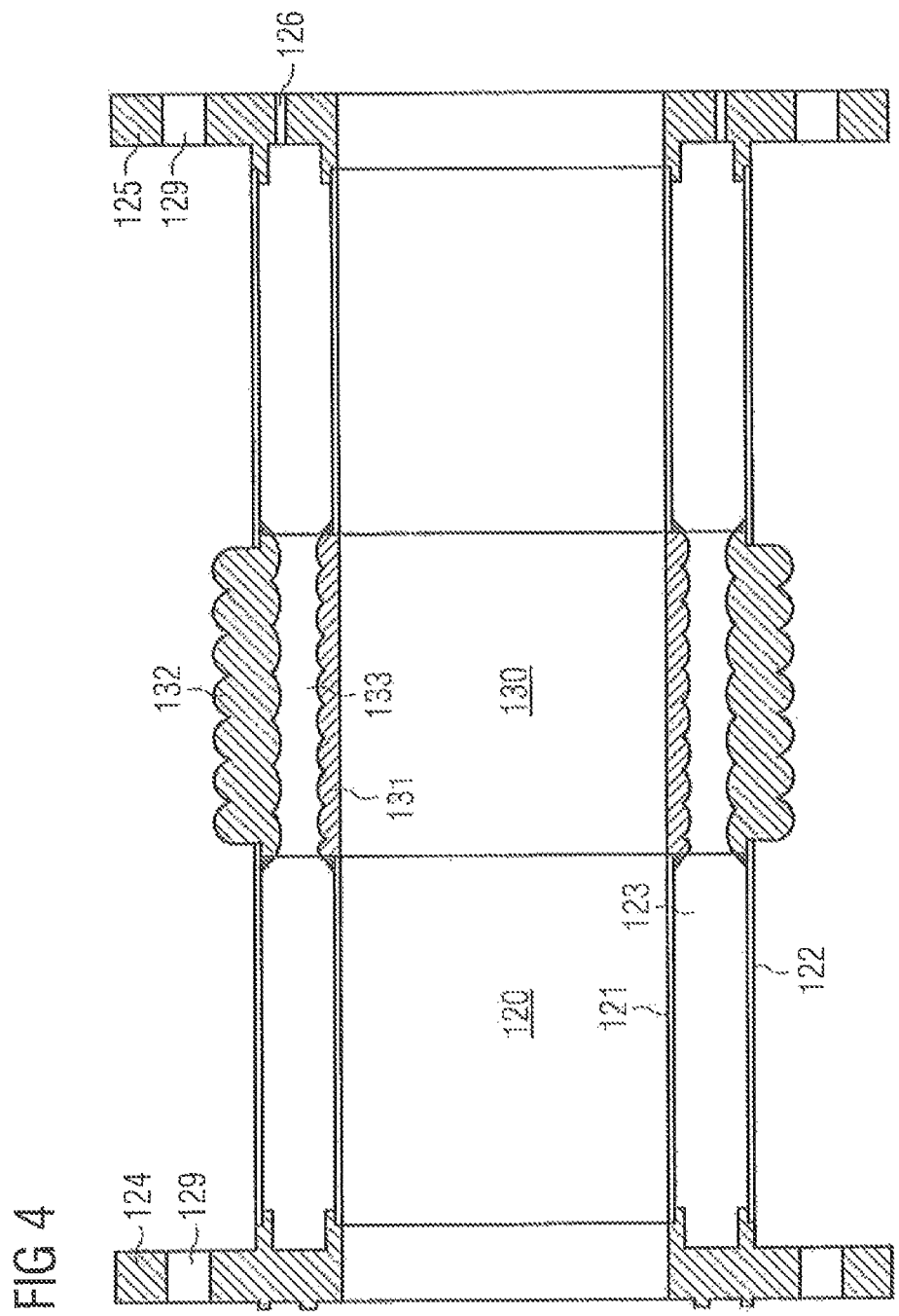
FIG. 4 shows a cross-sectional view of a fuel supply pipe element of the fuel supply system of FIG. 2 according to a second embodiment.

FIG. 4 shows a second embodiment of a fuel supply pipe element, namely linearly shaped fuel supply pipe element 120.

In the second end face element 125, a pipe element leakage detection opening 126 may be formed. Pipe element leakage detection opening 126 may connect leakage detection space 123 to the outside of fuel supply pipe element 120. Alternatively, pipe element leakage detection opening 126 may be formed in first end face element 124. Alternatively, fuel supply pipe element 120 may have a further leakage detection opening connecting fuel detection space 123 to the outside of fuel supply pipe element 120 and extending in a direction perpendicular to the direction in which the pipe element leakage detection opening 126 extends.

Further, fuel supply pipe element 120 may have a plurality of fixing holes 129, for example eight fixing holes 129 (only four fixing holes shown in FIG. 4, two fixing holes 129 on each of the right and left sides of fuel supply pipe element 120 as viewed in FIG. 4) for fixing a screw or the like, for example at first end face element 124 and second end face element 125. Preferably, fixing holes 129 may be arranged at a portion of first end face element 124 and second end face element 125, respectively, which is positioned outwards relative to the portion of first end face element 124 and second end face element 125, respectively, positioned adjacent to leakage detection space 123.

As further shown in FIG. 4, bellow element 130 may be welded to inner pipe 121 and outer pipe 122. Bellow element 130 may be arranged midway between first end face element 124 and second end face element 125. Alternatively, bellow element 130 may be arranged closer to first end face element 124 or closer to second end face element 125. Preferably, bellow element 130 may be spaced from first end face element 124 and/or second end face element 125 at least about 10 mm, preferably, at least about 20 mm, 30 mm, 40 mm, 50 mm, 75 mm or 100 mm, the exact distance being dependent on the length of fuel supply pipe element 110, 120.

In an assembled state, as shown in FIG. 2, a plurality of fuel supply pipe elements 110, 120 may be connected to each other such that inner pipes 111, 121 form a continuous inner pipe line and two neighboring outer pipes 112, 122 form a closed outer pipe line section, the two outer pipes 112, 122 being connected to each other by pipe element leakage detection openings 117, 126.

Figure 5:
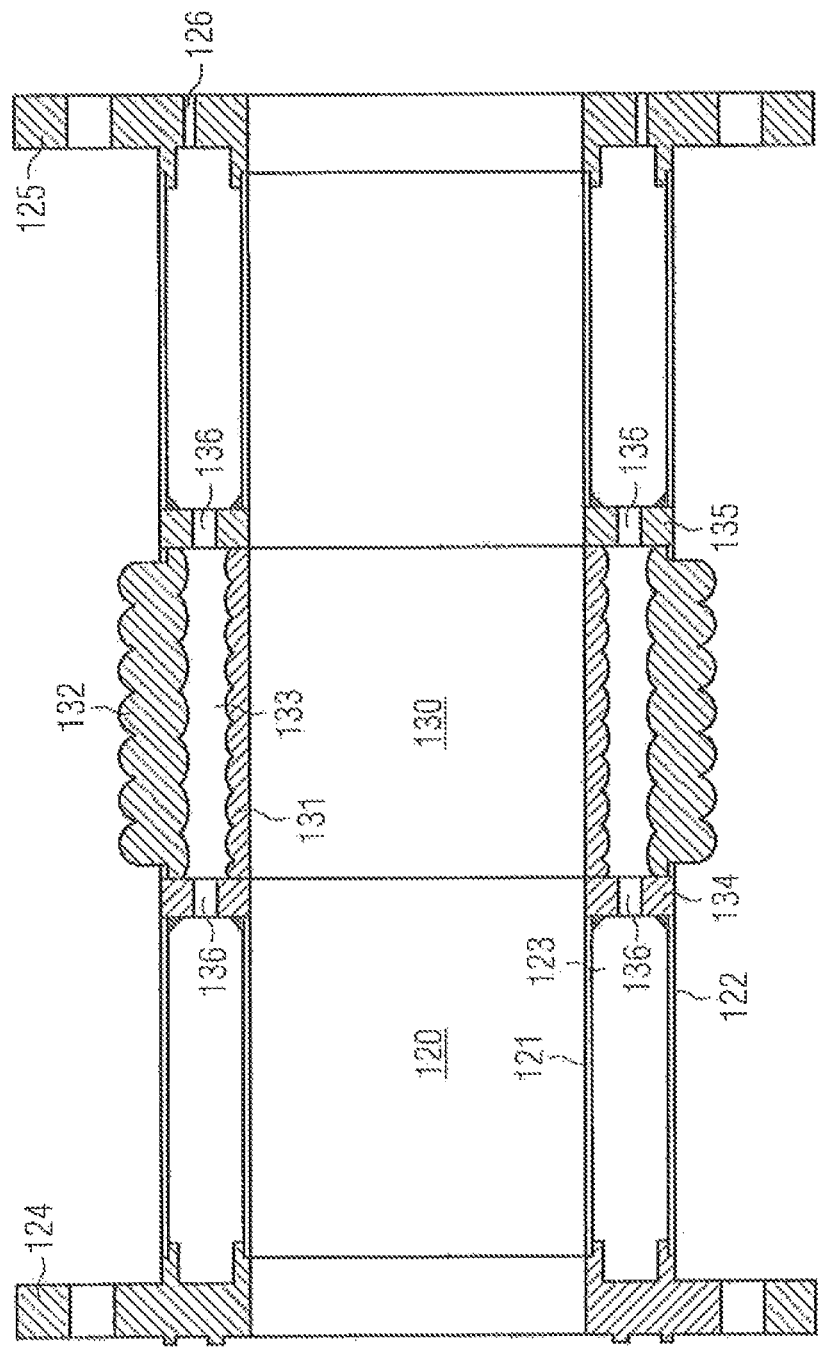
FIG. 5 shows a cross-sectional view of a fuel supply pipe element according to a third embodiment.

FIG. 5 shows a third embodiment of a fuel supply pipe element. The embodiment shown in FIG. 5 differs from the second embodiment in that bellow element 130 may be provided with a first bellow flange 134 at one end thereof and a second bellow flange 135 at the other opposing end thereof. First bellow flange 134 and second bellow flange 135 may be integrally formed with inner bellow 131 and outer bellow 132 and may be welded to inner pipe 121 or outer pipe 122. Alternatively, first bellow flange 134 and second bellow flange 135 may be welded or plug-connected to bellow element 130 and/or may be welded to only one of inner pipe 121 and outer pipe 122.

Figure 6:
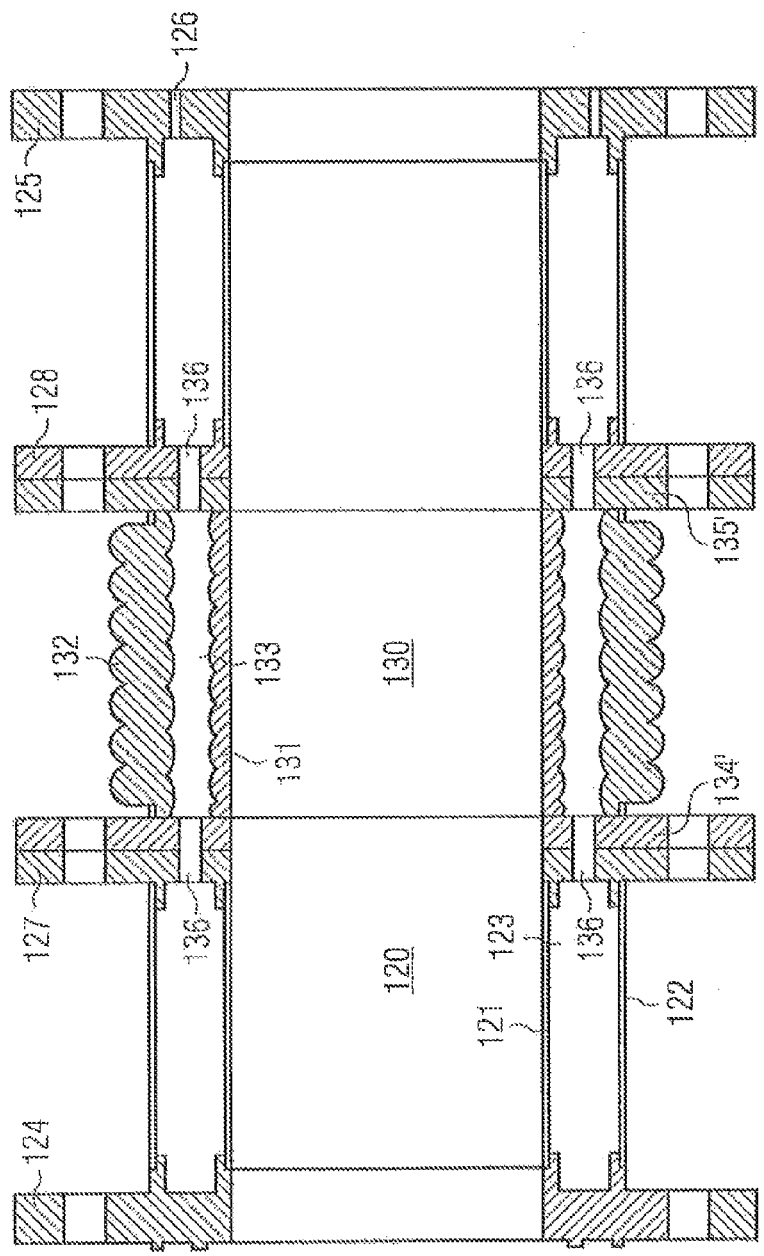
FIG. 6 shows a cross-sectional view of a fuel supply pipe element according to a fourth embodiment.

FIG. 6 shows a fourth embodiment of a fuel supply pipe element. The embodiment shown in FIG. 6 differs from the second embodiment in that fuel supply pipe element 120 may be provided with a first mounting flange 127 and a second mounting flange 128, each of which may be arranged adjacent to bellow element 130. In particular, first mounting flange 127 may be arranged adjacent to a first bellow flange 134' and second mounting flange 128 may be arranged adjacent to a second bellow flange 135'. First mounting flange 127 and first bellow flange 134' may be connected to each other, for example by screws or bolts (not shown). Second mounting flange 128 and second bellow flange 135' may be connected to each other, for example by screws or bolts (not shown). First mounting flange 127 and second mounting flange 128 may be connected to inner pipe 121 and outer pipe 122 by plug connection. Alternatively, first mounting flange 127 and second mounting flange 128 may be welded to inner pipe 121 and/or outer pipe 122. In case of more than one bellow element 130, fuel supply pipe element 120 may also have more than two mounting flanges 127, 128.

Figure 7:
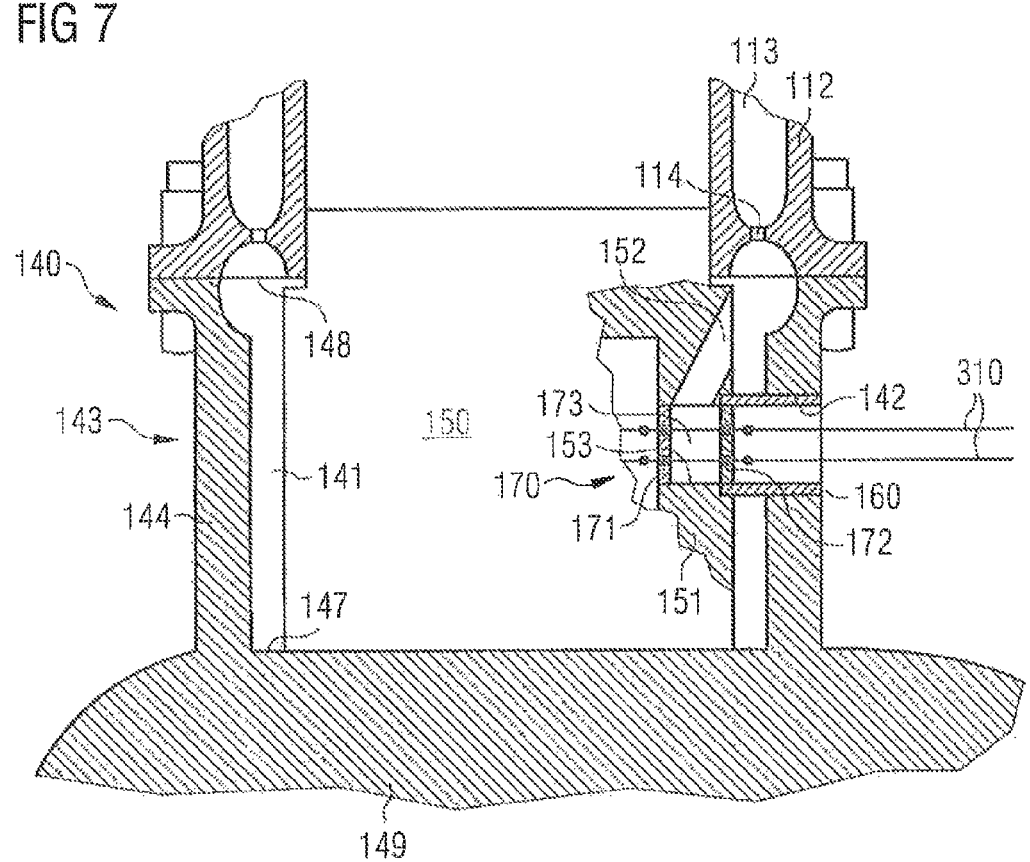
FIG. 7 shows a cross-sectional view of a section of a cylinder head according to a first embodiment of the present disclosure, the cylinder head having mounted therein a fuel inlet valve according to a first embodiment of the present disclosure.

FIG. 7 shows a first embodiment of inlet valve casing 143 and valve 150.

As shown in FIG. 7, inlet valve casing 143 may be integrally casted with cylinder head main body 149 and may have a larger dimension than fuel inlet valve 150 which results in leakage detection space 141. As FIG. 7 further shows, leakage detection space 141 may have a closed end face 147 and an open end face 148 opposing closed end face 147 in an up-and-down direction as viewed in FIG. 7. In an assembled state, closed end face 147 may be located on the combustion chamber side and open end face 148 may be located on the fuel supply pipe system side. Further, inlet valve casing 143 may comprise a casing through hole 142 extending from the outside to the inside of inlet valve casing 143. Casing through hole 142 may serve for receiving and guiding one or more cables 310 connecting valve 150 to power source 300.

As further shown in FIG. 7, valve housing 151 may also have a housing through hole 153 extending from leakage detection space 141 to the inside of fuel inlet valve 150. Housing through hole 153 may serve for guiding cables 310. In housing through hole 153, a barrier element 170 may be arranged. Barrier element 170 may comprise an inner barrier 171 and an outer barrier 172. Inner barrier 171 and outer barrier 172 may define a valve leakage detection space 173 there between.

Each of inner barrier 171 and outer barrier 172 may comprise two cable bushings (not shown in detail). Alternatively, each of inner barrier 171 and outer barrier 172 may comprise one or more than two cable bushings. The cable bushings may serve as a guidance for guiding cables 310 from the inside of fuel inlet valve 150 to the outside of fuel supply system 10 via housing through hole 153 of fuel inlet valve 150 and casing through hole 142 of inlet valve casing 143.

Valve housing 151 may further have a first valve leakage detection opening 152. First valve leakage detection opening 152 may extend from leakage detection space 173 of barrier element 170 to leakage detection space 141. First valve leakage detection opening 152 may extend obliquely in valve housing 151 in an upward or downward direction as viewed in FIG. 7.

A bushing 160 may be arranged in casing through hole 142. Bushing 160 may extend from the outside of inlet valve casing 143 into at least part of the valve housing 151 for protecting cables 310 from the high pressure gas in leakage detection space 141. Bushing 160 may be made of metal materials or plastic materials. Further, bushing 160 may comprise an external thread and may be screwed into casing through hole 142. In this case, casing through hole 142 may be provided with an internal thread. Alternatively, bushing 160 may be provided with a flange having fixing holes for fixing bushing 160 at cylinder head 140, particularly, at inlet valve casing 143, with fastening means, such as screws or bolts. The length and diameter of bushing 160 may be dependent on the size of cylinder head 140. For example, bushing 160 may have a length between 80 mm and 100 mm, preferably 81 mm, 85 mm, 90 mm, 95 mm. Further, in case of a bushing having a length between 80 mm and 100 mm, bushing 160 may have a diameter between 30 and 40 mm, preferably 32.5 mm, 35 mm or 37.5 mm.

Figure 8:
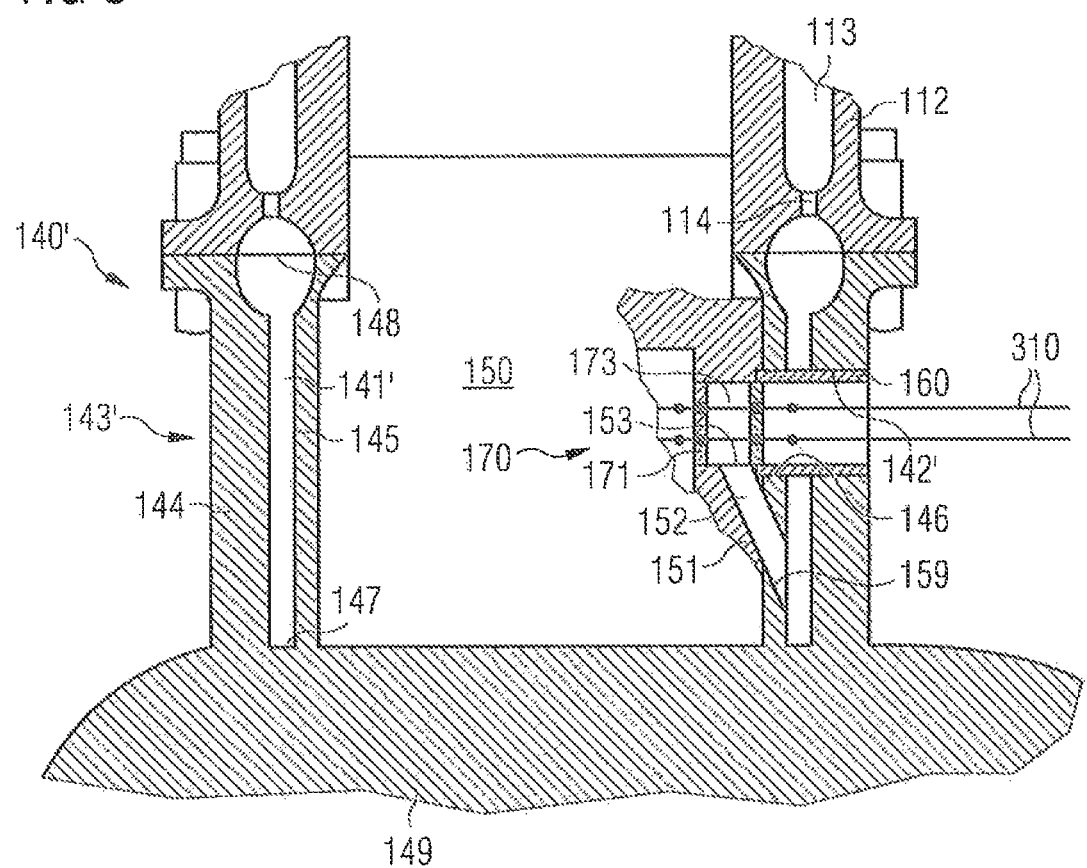
FIG. 8 shows a cross-sectional view of a part of a cylinder head according to a second embodiment of the present disclosure, the cylinder head having mounted therein the fuel inlet valve shown in FIG. 7.

FIG. 8 shows a cylinder head 140' according to a second embodiment. Cylinder head 140' differs from cylinder head 140 in that it may comprise an inlet valve casing 143' comprising an outer casing wall 144 and an inner casing wall 145. Inner casing wall 145 and outer casing wall 144 may define a leakage detection space 141' there between. Outer casing wall 144 may have an internal dimension being the same as an external dimension of fuel inlet valve 150 such that fuel inlet valve 150 fits into inner casing wall 145.

Inner casing wall 145 may have a casing through hole 146. Casing through hole 146 may extend from leakage detection space 141 to the inside of valve casing 143 and may oppose casing through hole 142. Casing through hole 146 may serve for guiding cables 310.

Inner casing wall 145 may have a second valve leakage detection opening 159. Second valve leakage detection opening 159 may be located below casing through hole 146 as viewed in FIG. 8. Alternatively, second valve leakage detection opening 159 may be located above casing through hole 146. In an assembled state, second valve leakage detection opening 159 may be fluidly connected to leakage detection space 173 of barrier element 170 via first valve leakage detection opening 152.

Figure 9:
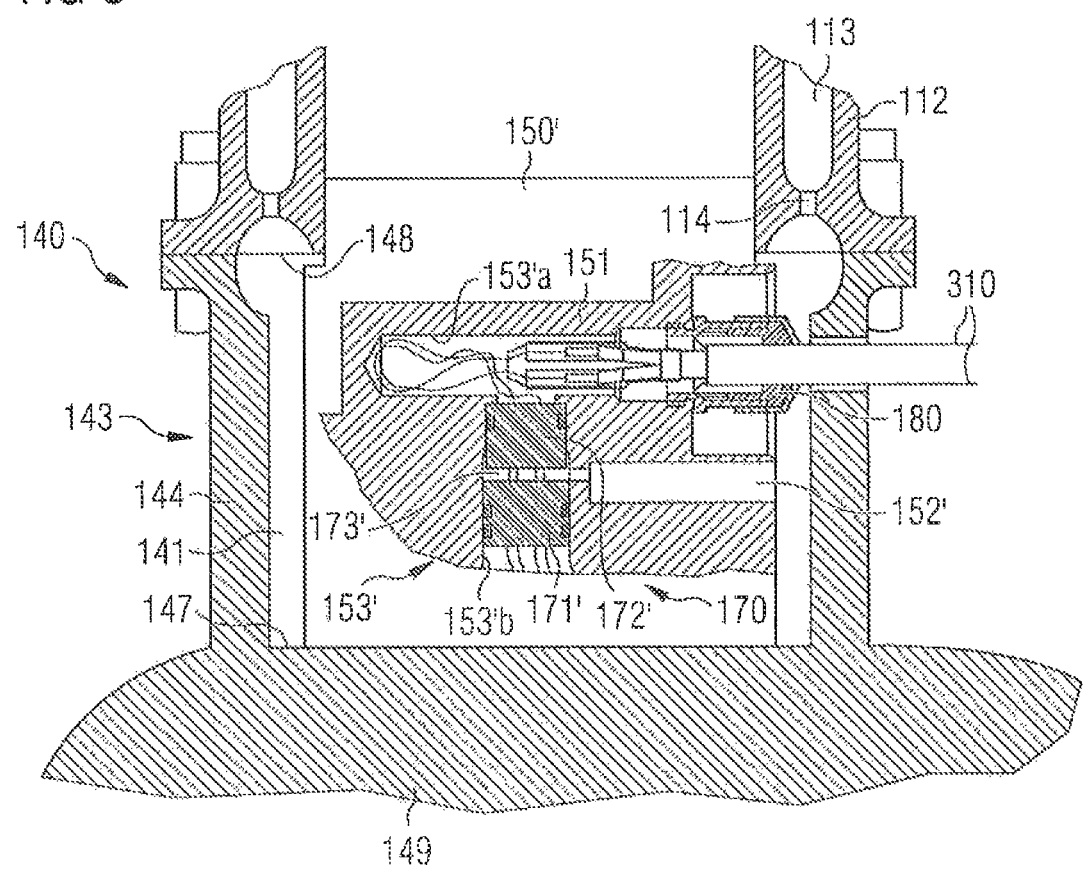
FIG. 9 shows a cross-sectional view of a part of a cylinder head according to the first embodiment of the present disclosure, the cylinder head having mounted therein a fuel inlet valve according to a second embodiment of the present disclosure.

FIG. 9 shows fuel inlet valve 150' according to a second embodiment. In particular, fuel inlet valve 150' shown in FIG. 9 may differ from fuel inlet valve shown in FIG. 8 in that a barrier element 170' may be shifted around 90 degree. Accordingly, barrier element 170' may comprise an inner barrier wall 171', an outer barrier wall 172' and a leakage detection space 173' oriented and arranged, respectively, in a left-right-direction, e.g., a horizontal direction in an assembled state, as viewed in FIG. 9 in valve housing 151'.

Further, fuel inlet valve 150' may comprise a two-sectional housing through hole 153'. Housing through hole 153' may comprise a first housing through hole portion 153'*a* and a second housing through hole portion 153'*b*. First housing through hole portion 153'*a* may extend in the horizontal direction from the outside into valve housing 151' as viewed in FIG. 9. First housing through hole portion 153'*a* may be sealed against the outside with a nut 180 screwed into first housing through hole portion 153'*a*, nut 180 guiding cables 310 from the inside of valve 150' to the outside of valve 150'. Alternatively, first housing through hole portion 153'*a* may be sealed with any other suitable element, such as a plug. Second housing through hole portion 153'*b* may extend in a direction perpendicular to first housing through hole portion 153'*a* midway of first housing through hole portion 153'*a*. Alternatively, second housing through hole portion 153'*b* may extend at the end of first housing through hole portion 153'*a* opposing the end of first through hole portion closed with nut 180. Second housing through hole portion 153'*b* may have two different diameters in an up-and-down-direction as viewed in FIG. 9. In particular, housing through hole 153' may have a smaller diameter in an upper portion than in a lower portion. Correspondingly, inner barrier wall 171' located in the lower portion of housing through hole 153' may have a larger diameter than outer barrier wall 172' located in the upper portion of housing through hole 153'. In this way, a defined leakage detection space 173' may be achieved. The construction of housing through hole 153' having different diameters may also be applied to fuel inlet valve 150 according to the first embodiment.

Figure 10:
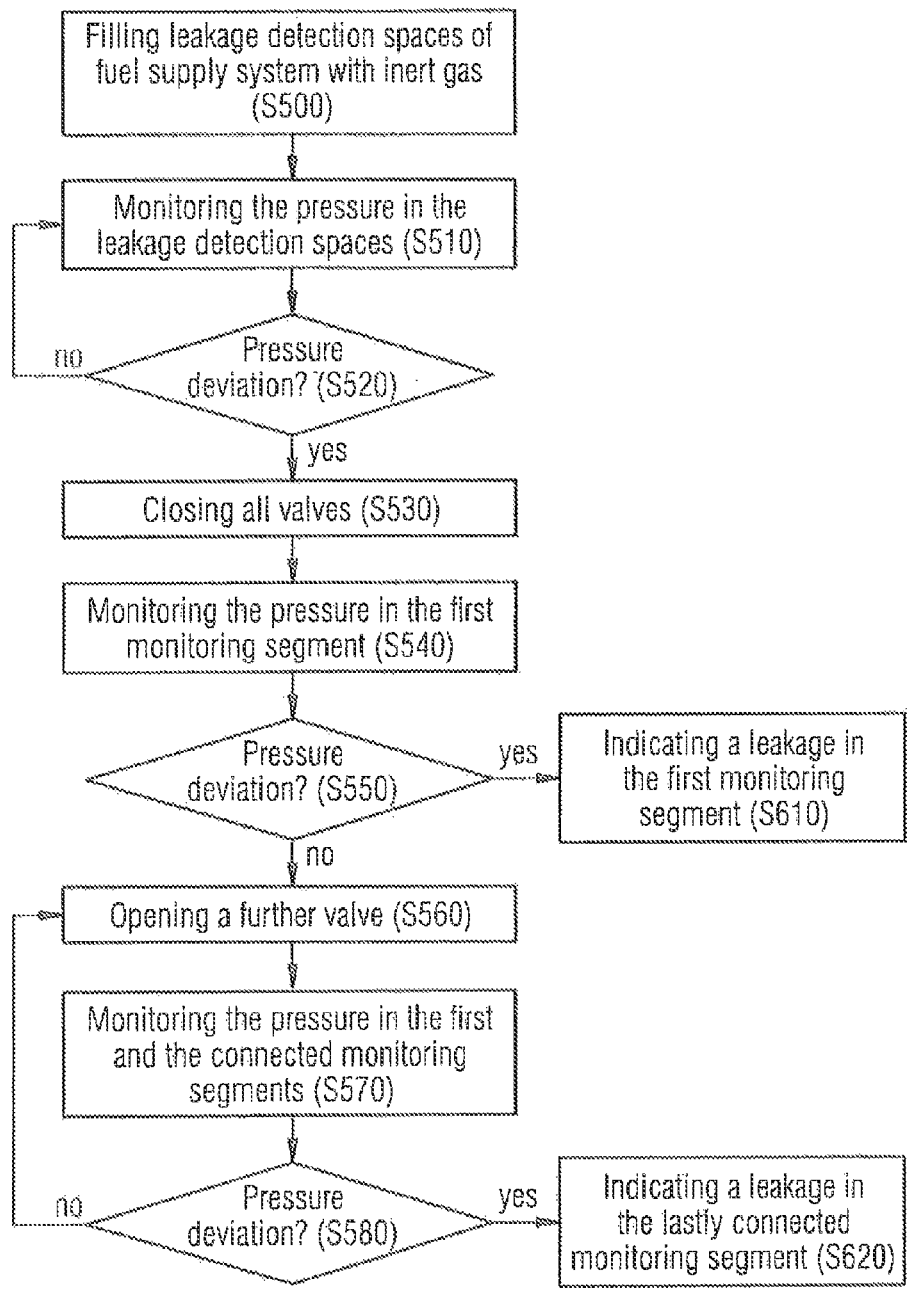
FIG. 10 shows a flow chart of a method for detecting a leakage in the fuel supply system of FIG. 1.

FIG. 10 shows a flow chart describing a method for detecting a leakage in fuel supply system 10. In a first step, leakage detection spaces 113, 123, 133, 141, 173 of fuel supply system 10 may be filled with inert gas. Afterwards, the pressure in each of leakage detection spaces 113, 123, 133, 141, 173 may be monitored by use of pressure sensor 230.

In case pressure sensor 230 detects a pressure deviation, for example, a pressure drop, all valves 210 of inert gas supply pipe system 200 may be closed such that only a first monitoring segment 20A is connected to pressure sensor 230.

Again, the pressure in leakage detection spaces 113, 123, 133, 141, 173 of the first monitoring segment 20A may be monitored. In case of a pressure deviation, for example, a pressure drop, pressure sensor 230 may output a corresponding signal to control unit 30 which indicates a leakage in first monitoring segment 20A, for example, by alarm or visual indicator. In case of no pressure deviation, for example, no pressure drop, in leakage detection spaces 113, 123, 133, 141, 173 of the first monitoring segment 20A, a first one of the valves 210 of the inert gas supply pipe system 200 may be opened such that the first monitoring segment 20A and a subsequent second monitoring segment 20B are connected to the pressure sensor 230.

Again, the pressure in the first and the second monitoring segments 20A, 20B may be monitored. In case of a pressure deviation, for example, a pressure drop, pressure sensor 230 may output a corresponding signal to control unit 30 which indicates a leakage in second monitoring segment 20B, for example, by alarm or displaying. In case of no pressure drop in the first and the second monitoring segments 20A, 20B, the steps of opening a further one of the valves 210 of the inert gas supply pipe system 200 and monitoring the pressure in the corresponding monitoring segment 20C and the monitoring segments 20A, 20B already connected to pressure sensor 230 may be repeated until a pressure deviation and, consequently, the monitoring segment in which fuel is leaking out of inner pipes 111, 121 or valve 150 is detected.

Alternatively, the method may also be performed by closing one valve 210 after the another and monitoring whether the pressure in the respective monitoring segments still changes or not. In case the pressure stays constant, the leakage may occur in the lastly separated monitoring segment 20A, 20B, 20*c*, . . . , 20*n*.

In other embodiments of the present disclosure, fuel supply system 10 may additionally be provided with a fuel detection sensor, for example, a sensor for detecting gaseous or liquid fuel. In this case, the fuel detection sensor detects the leakage of fuel by sensing the fuel itself, alternatively to detecting the leakage of fuel by sensing a pressure deviation. Further, in order to accelerate the detection of the leakage, fuel supply system 10 may be provided with a fuel suction system such as a pump or the like. In this case, fuel may be sucked out of the leakage detection spaces by use of the fuel suction system. The fuel suction system may be arranged anywhere, for example, at one end of inert gas supply pipe system 200, in particular, inert gas supply pipe 220. Exemplary embodiments using a fuel detection sensor to detect the leakage of fuel will be described in the following with reference to FIGS. 11 to 13.

Figure 11:
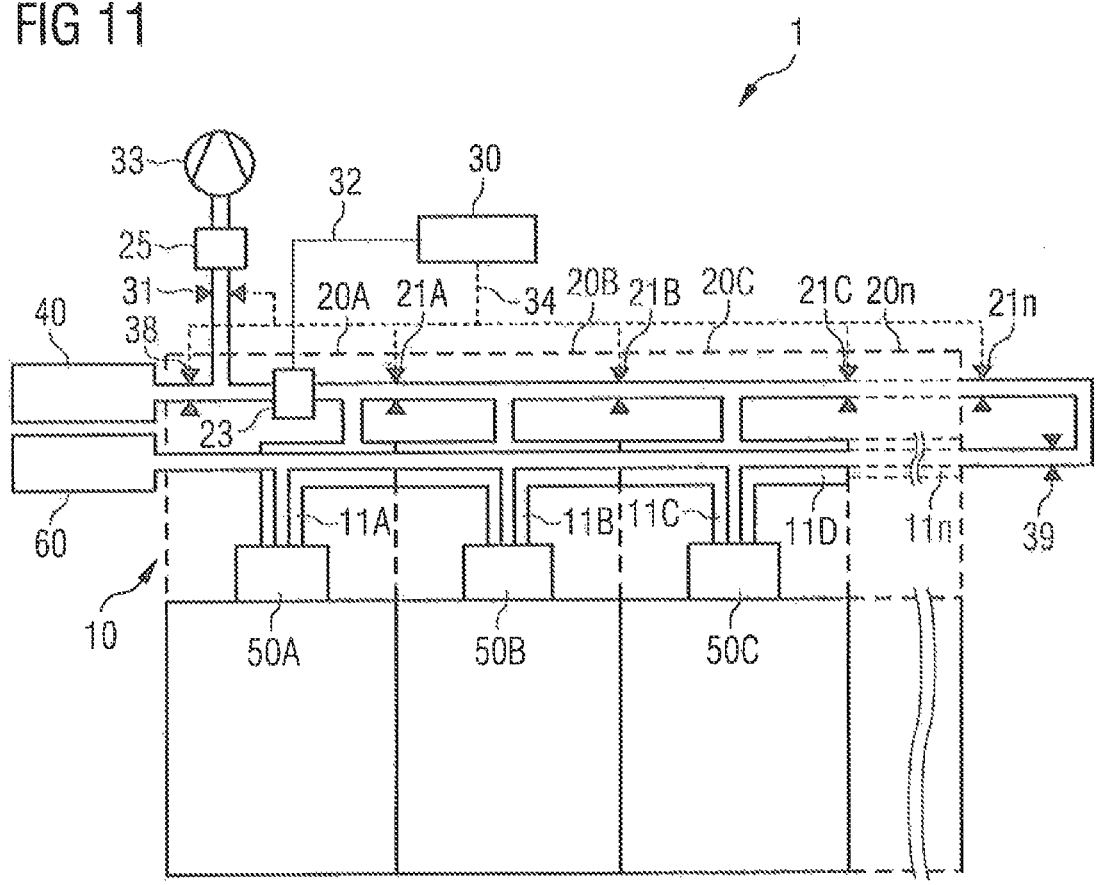
FIG. 11 shows a schematic overview of an internal combustion engine having a fuel supply system according to the present disclosure.

FIG. 11 shows a first embodiment of an internal combustion engine 1 including a fuel system 10 configured for detecting a leakage of fuel by sensing the fuel itself. The configuration of the embodiment shown in FIG. 11 is similar to that of the embodiment shown in FIG. 1, such that only the differences to the embodiment shown in FIG. 1 will be described.

As shown in FIG. 11, fuel supply system 10 may include a fuel detection sensor 25 and a suction device 33 as well as the pressure sensor 23.

Fuel detection sensor 25 may be fluidly connectable to the plurality of monitoring segments 20A, 20B, 20C, . . . , 20*n*. Fuel detection sensor 25 may be a sensor for detecting gaseous or liquid fuel. Fuel detection sensor 25 may be any known fuel detection sensor capable of detecting the amount or concentration of fuel in a fluid. For example, fuel detection sensor 25 may be a gas sensor 25 configured to detect the amount/concentration of gaseous fuel in a fluid such as air or the like.

Suction device 33 may be fluidly connectable to the plurality of monitoring segments 20A, 20B, 20C, . . . , 20*n* via a shut-off valve 31 and may be configured to suck air or gas from fuel supply system 10, in particular, inert gas supply pipe 220 and leakage detection spaces 113 and 123. For example, suction device 33 may be a vacuum pump or any other known pump capable of sucking air or gas from fuel system 10 to thereby create a vacuum or a low pressure in fuel supply system 10, in particular, inert gas supply pipe 220 and leakage detection spaces 113, 123. While suction device 33 is shown upstream of detection sensor 25, in other embodiments fuel detection sensor 25 may be disposed upstream of suction device 33. Shut-off valve 31 may be disposed, for example, between pressure sensor 23 and fuel detection sensor 25. Shut-off valve 31 may be configured to selectively communicate suction device 33 with inert gas supply pipe system 200 (see FIG. 2), in particular, inert gas supply pipe 220 and leakage detection spaces 113 and 123 in each of fuel line sections 11A, 11B, 11C, . . . , 11*n*.

Shut-off valve 31 may be controlled by control unit 30 via one of control lines 34. Fuel detection sensor 25 and suction device 33 may also be controlled by control unit 30 via corresponding communication lines (not shown).

In the embodiment shown in FIG. 11, pressure sensor 23, fuel detection sensor 25 and suction device 33 may be fluidly connected to fuel supply system 10 on the same side as inert gas reservoir 40 and fuel reservoir 60, for example, to monitoring segment 20A. A shut-off valve 38 may be connected between inert gas reservoir 40 and the pressure monitoring system, for example, monitoring segment 20A to selectively connect inert gas reservoir 40 with the pressure monitoring system. On the opposite side, the fuel line system and the pressure monitoring system may be fluidly connectable via a shut-off valve 39. For example, inert gas supply pipe 220 of monitoring segment $20n$ may be fluidly connectable to inner pipe 111, 121 of fuel line section $11n$. It is understood that a similar configuration may also be used in the embodiment shown in FIG. 1, i.e. pressure sensor 23 and inert gas reservoir 40 may both be fluidly connectable to monitoring segment 20A on one side and inert gas supply pipe 220 may be fluidly connectable to the fuel line system on the other side of fuel system 10.

A method for detecting leakage in the fuel supply system 10 of FIG. 11 will be described in the following.

During normal operation of internal combustion engine 1, inert gas reservoir 40 may be fluidly separated from fuel supply system 10, for example, by closing shut-off valve 38 separating inert gas reservoir 40 from monitoring segments 20A, 20B, 20C, . . . , $20n$ and fuel line sections 11A, 11B, 11C, 11D, . . . , $11n$. In this state, shut-off valve 39 may be closed, and the remaining valves 21A, 21B, 21C, . . . $21n$ and shut-off valve 31 may be opened and suction device 33 may be operating to suck air and/or gas from fuel supply system 10. Suction device 33, for example, a vacuum pump, may be continuously operated to maintain a vacuum or a low pressure in fuel supply system 10, in particular, in inert gas supply pipe 220 and leakage detection spaces 113, 123 (see FIG. 2). Further, fuel detection sensor 25 may be controlled by control unit 30 to continuously detect the amount or concentration of fuel in the air or gas at fuel detection sensor 25.

During normal operation, in case no leakage of fuel is present, no fuel will be detected by fuel detection sensor 25 in the air or gas sucked from fuel supply system 10 by fuel suction device 33. In case of a leakage of fuel into fuel detection spaces 113, 123 and, accordingly, into inert gas supply pipe 220, the leaked fuel will be sucked out of fuel supply system 10 by suction device 33. Accordingly, fuel detection sensor 25 will detect an increased amount of fuel in the air or gas sucked out by fuel suction device 33. Fuel detection sensor 25 may output a corresponding detection result to control unit 30 via a corresponding communication line (not shown), and control unit 30 may determine that a leak has occurred on the basis of this detection result.

When the occurrence of a leak is determined, inert gas reservoir 40 may be fluidly connected with fuel supply system 10 to flush the same. For example, shut-off valve 31 may be closed, and shut-off valves 38 and 39 may be opened to fluidly connect inert gas reservoir 40 to the pressure monitoring system and the fuel line system. Inert gas supply pipe 220 and leakage detection spaces 113, 123 may be filled with inert gas. Then, for example, valves 21A, 21B, 21C, . . . $21n$ may be closed such that only first monitoring segment 20A is fluidly connected to pressure sensor 23 and inert gas reservoir 40, as described above with reference to the method shown in FIG. 10.

The remaining steps in the method for detecting a leakage in fuel supply system 10 shown in FIG. 11 may be the same as those described above for the embodiment shown in FIG. 1. In other words, different numbers of monitoring segments 20A, 20B, 20C, . . . , $20n$ may be successively connected to pressure sensor 23, and the location of the leak may be determined from the results output by pressure sensor 23 for the different configurations of monitoring segments 20A, 20B, 20C, . . . , $20n$. In this manner, detection of the position of a leak in fuel supply system 10 using a single pressure sensor 23 is also possible in the embodiment shown in FIG. 11. In addition, with the embodiment shown in FIG. 11, it is also possible to detect a leak in fuel supply system 10 with respect to the outside. In case of such a leak, air is drawn into fuel supply system 10 due to the vacuum or low pressure created by suction device 33. Accordingly, the pressure inside fuel supply system 10 may be monitored by pressure sensor 23 during normal operation of internal combustion engine 1, and in case an increase in the pressure measured by pressure sensor 23 is detected, it may be determined that a leakage of air into fuel supply system 10 from the outside has occurred.

Figure 12:
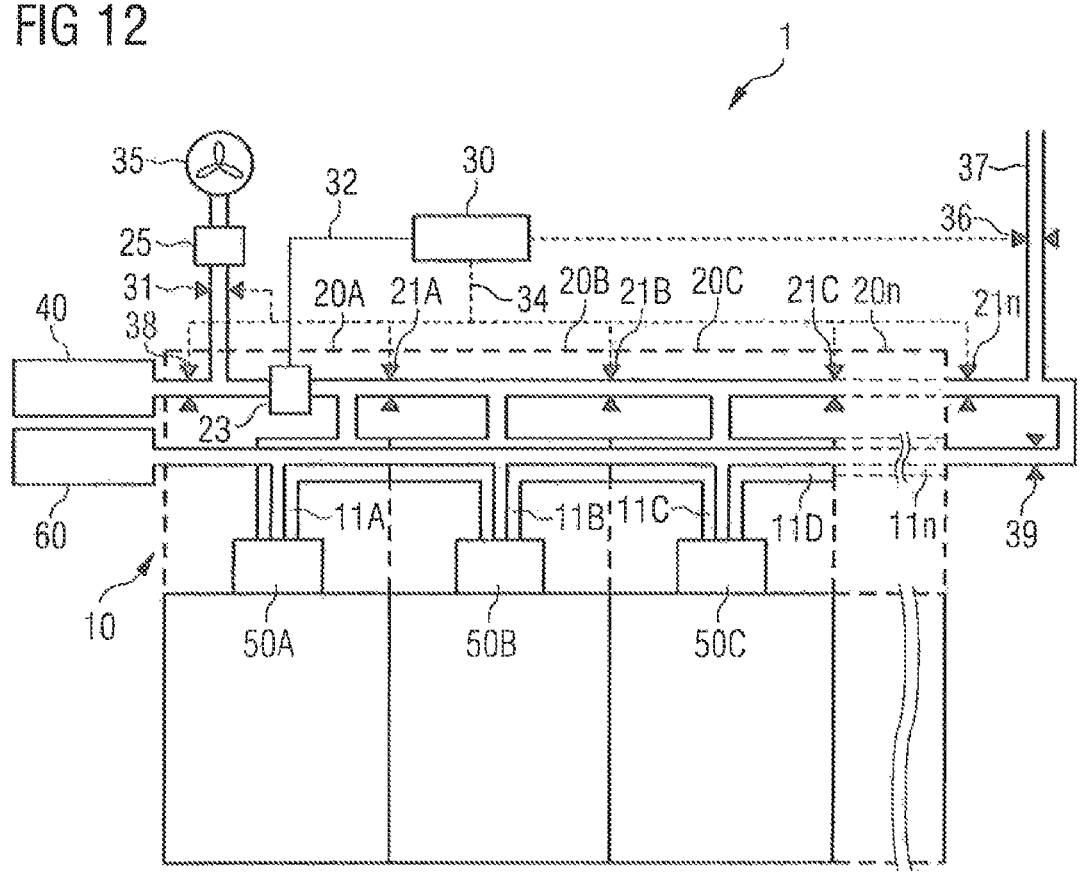
FIG. 12 shows a schematic overview of an internal combustion engine having a fuel supply system according to the present disclosure.

FIG. 12 shows another embodiment of a fuel supply system 10 including a fuel detection sensor.

In the embodiment shown in FIG. 12, a different suction device than the one shown in FIG. 11 may be used to suck air or gas from fuel supply system 10. In particular, a suction device 35 such as an exhauster or an exhaust fan or the like may be used to draw air from fuel supply system 10. Further, fuel supply system 10, in particular, inert gas supply pipe 220 and leakage detection spaces 113, 123 may be communicated with the outside via an air supply pipe 37. Air supply pipe 37 may be connected to fuel supply system 10, for example, at monitoring segment $20n$, to supply outside air to inert gas supply pipe 220 and leakage detection spaces 113, 123. A shut-off valve 36 may be disposed in air supply pipe 37 to selectively allow air to enter fuel supply system 10. Shut-off valve 36 may be controlled by control unit 30 via a corresponding communication line 34.

During normal operation, inert gas reservoir 40 may again be fluidly separated from fuel supply system 10, for example, by closing shut-off valve 38. Shut-off valves 31, 36 may be opened, and suction device 35 may draw air entering via air supply pipe 37 from fuel supply system 10 with shut-off valve 39 being closed. In this manner, a continuous flow of air through fuel supply system 10 may be maintained by corresponding operation of suction device 35. In some embodiments, suction device 35 and/or shut-off valve 36 may be configured such that the amount of air or gas entering fuel supply system 10 is smaller than the amount of air or gas exhausted from fuel supply system 10 by suction device 35 to create a negative or low pressure in fuel supply system 10, in particular, inert gas supply pipe 220 and leakage detection spaces 113, 123. Fuel detection sensor 25 may detect the amount of fuel in the air flowing through fuel supply system 10, and in case an increased amount of fuel is detected, it may be determined that a leakage of fuel has occurred.

In case of a detection of a leakage of fuel by fuel detection sensor 25, shut-off valve 36 may be closed, inert gas reservoir 40 may be fluidly connected to fuel supply system 10 to flush the same, and shut-off valve 31 may also be closed. Then, the location of the leak may be determined using pressure sensor 23 in the above-described manner, i.e. by measuring the pressure in fuel supply system 10 section by section.

FIG. 13 shows another embodiment of a fuel supply system 10, which is a modification of the embodiment shown in FIG. 12.

In the embodiment shown in FIG. 13, an inlet of air supply pipe 37 is fluidly connected to an outlet of suction device 35. In this manner, air or gas may be circulated through fuel supply system 10 by suction device 35. For example, suction device 35 may be an exhauster, a blower, a fan, a pump, or the like. In this manner, a continuous flow of air or gas through monitoring segments 20A, 20B, 20C, . . . , 20n and past or through fuel detection sensor 25 may be achieved, and an increase in the amount or concentration of fuel may be detected by fuel detection sensor 25 in the above-described manner. In response to a detection of an increased amount of fuel, the above-described method for determining the location of a leak may be performed.

INDUSTRIAL APPLICABILITY

During operation of the fuel supply system 10 shown in FIG. 1, fuel such as gas or liquid fuel may be supplied by inner pipes 111, 121 of fuel supply pipe system 100 to each of the fuel inlet valves 150 for being fed to combustion chambers of internal combustion engine 1. Further, inert gas may be supplied to outer pipes 112, 122 of each fuel pipe section 101 via inert gas supply pipe system 200, in particular, inert gas supply pipe 220 and connecting parts 240. The inert gas may have a pressure of about 7 bar, i.e., a higher pressure than the fuel guided in inner pipes 111, 121. As the pressure of the inert gas depends on the pressure of the fuel used in the fuel supply system, the inert gas may also have a higher or lower pressure than 7 bar. In general, the pressure of the inert gas may be higher than the pressure of the fuel.

In case of a leakage in fuel supply pipe system 100, for example in the continuous inner pipe line defined by the plurality of inner pipes 111, 121, the high pressure inert gas may flow from outer pipes 112, 122 to inner pipes 111, 121 resulting in a pressure drop in outer pipes 112, 122 and inert gas supply pipe 220. Pressure sensor 230 may sense the pressure drop and may output a corresponding signal as pressure behaviour information to control unit 30 which indicates the pressure deviation, for example, by an alarm signal.

In the embodiments shown in FIGS. 11 to 13, the occurrence of a leak may be detected by monitoring the amount or concentration of fuel in outer pipes 112, 122 and inert gas supply pipe 220. Accordingly, in these embodiments, fuel detection sensor 25 may output a corresponding signal to control unit 30 which indicates the detection of fuel, for example, by an alarm signal.

In case of such an alarm signal, the leakage may be localized by performing the following local leakage detection method (see FIG. 10). Firstly, in step S530, all of shut off valves 210 may be closed such that only a first monitoring segment 20A, for example the monitoring segment located next to pressure sensor 230, is connected to pressure sensor 230. Then, in steps S540 and S550, pressure sensor 230 may monitor the pressure in leakage detection spaces 113, 123, 133, 141, 173 of the first monitoring segment 20A. In case of a leakage, in the first monitoring segment 20A, the inert gas in leakage detection spaces 113, 123, 133, 141, 173 may flow into inner pipes 111, 121 or valve 150 of the first monitoring segment 20A and pressure sensor 230 may detect a pressure drop in leakage detection spaces 113, 123, 133, 141, 173 and the leakage may be indicated by control unit 30 (step S610). In case of no leakage in the first monitoring segment 20A, for example, if the pressure in leakage detection spaces 113, 123, 133, 141, 173 stays constant at about 7 bar, the first shut off valve 210 may be opened such that the first monitoring segment 20A and a second monitoring segment 20B are both connected to pressure sensor 230 (step S560). Again pressure sensor 230 may monitor whether there is a pressure drop in the first and the second monitoring segments 20A, 20B or not (steps S570, S580). In case the pressure sensor 230 cannot detect a pressure drop in the first and second monitoring segments 20A, 20B, a second shut off valve 210 may be opened and pressure sensor 230 may monitor the pressure in the first, second and third monitoring segment 10A, 10B, 20C (step S560). The steps of opening one shut off valve 210 after the other and monitoring the pressure (steps S570 and S580) may be repeated until a pressure drop is detected by pressure sensor 230 and correspondingly indicated by control unit 30 (step S620).

In some embodiments, the method for detecting a leakage in fuel supply system 10 of internal combustion engine 1 may comprise the steps:

performing a first pressure measurement of a pressure within the pressure monitoring system 20 having the set of valves 21A, 21B, 21C . . . , 21n opened to fluidly connect the monitoring segments 20A, 20B, 20C . . . , 20n to be monitored with pressure sensor 23, detecting a change in pressure caused by a leakage from one of inner pipes 11 or valve 150, performing at least one further pressure measurement for a selected set of fluidly connected monitoring segments 20A, 20B, 20C . . . , 20n for providing pressure behaviour information for two sets that differ in size by one monitoring segment 20A, 20B, 20C . . . , 20n, and identifying the leaking monitoring segment based on the comparison of the pressure behaviour information of the two sets that differ in size by one monitoring segment 20A, 20B, 20C . . . , 20n.

In some embodiments, the pressure measurement of above described method may further comprise the following steps:

activating a first valve of the set of valves 21A, 21B, 21C . . . , 21n, thereby providing a first separation of the monitoring segments 20A, 20B, 20C, . . . , 20n into a first pressure monitored subset of the monitoring segments 20A, 20B, 20C . . . , 20n fluidly connected to pressure sensor 23 and a first remote subset of the monitoring segments 20A, 20B, . . . , 20n fluidly disconnected from pressure sensor 23;

monitoring the pressure within the first pressure monitored subset of the monitoring segments 20A, 20B, 20C . . . , 20n, thereby, in dependence on detecting a continued changing of the pressure or a constant pressure, associating the first pressure monitored subset of the monitoring segments 20A, 20B, 20C, . . . , 20n or the first remote subset of the monitoring segments 20A, 20B, 20C, . . . , 20n to include the leaking monitoring segment.

In some embodiments, the pressure measurement of above described method may further comprise the following steps:

activating a second valve of the set of valves 21A, 21B, 21C, . . . , 21n such that the subset of monitoring segments 20A, 20B, 20C, . . . , 20n corresponding to the leaking monitoring segments is reduced by at least one monitoring segment 20A, 20B, 20C, . . . , 20n, thereby providing a second separation of the monitoring segments 20A, 20B, 20C, . . . , 20n into a second pressure monitored subset fluidly connected to pressure sensor 23 and a second remote subset fluidly disconnected from the pressure sensor 230;

monitoring the pressure within the second pressure monitored subset of the monitoring segments 20A, 20B, 20C, . . . , 20n; and in dependence on the detected pressure behaviour of the first and second separation, identifying the leaking monitoring segment.

Alternatively, the pressure of the inert gas may be lower than the pressure of the fuel, preferably between atmospheric pressure and the pressure of the fuel. In case of a leakage in fuel supply pipe system 100, for example in the continuous inner pipe line defined by the plurality of inner pipes 111, 121, the high pressure fuel may flow from inner pipes 112, 122 to outer pipes 111, 121 resulting in a pressure increase in outer pipes 112, 122 and inert gas supply pipe 220. Pressure sensor 230 may sense the pressure increase and may output a corresponding signal as pressure behaviour information to control unit 30 which indicates the pressure deviation, for example, by an alarm signal according to the above described method.

In this way, each of monitoring segments 20A, 20B, 20C, . . . , 20n can be easily monitored by use of only one pressure sensor 23. Accordingly, a reliable and quick method for detecting a leakage in fuel supply system 10 may be provided.

Further, in case the pressure of the inert gas is lower than the pressure of the fuel, preferably between atmospheric pressure and the pressure of the fuel, a leakage in outer pipe 112, 122 may also be sensed by sensor 230, because this would lead to a pressure drop in outer pipes 112, 122 and, hence, in inert gas supply pipe 220. Accordingly, it is possible to identify whether the inner pipes 111, 121 or the outer pipes 112, 122 have a leakage.

Further, flushing of the fuel supply system 10 which is a requirement of classification societies and may be done after each operation in gas mode in case of dual fuel engine is possible. Flushing of inner pipes 111, 121 may be performed by opening, preferably automatically opening, a valve (shut-off valve 39, see FIGS. 11 to 13) in a corresponding connection line connecting inert gas supply pipe 220 with inner pipes 111, 121.

Further, due to the construction of each of fuel supply pipe elements 110, 120 comprising at least one bellow element 130, heat expansion of fuel supply elements due to high temperatures in fuel supply system 10 may be allowed while at the same time leakage monitoring is allowed. In particular, as bellow element 130 which may act as a compensation element for heat expansions of fuel supply pipe element 110, 120 may be integrated in fuel supply pipe element 110, 120, it may be stabilized by right and left parts of fuel supply pipe element 110, 120 adjacent to bellow element 130. Accordingly, sagging of bellow element 130 may be reduced or even prevented, even if fuel supply pipe element 110, 120 has a large dimension. Moreover, due to the construction of bellow element 130 which may have open end faces connecting leakage detection space 133 to leakage detection space 113, 123, large fuel supply pipe elements 110, 120 may be monitored with respect to a leakage.

Further, due to the construction of cylinder head 140, 140' and fuel inlet valve 150, fuel supply system 10 may be formed safer and the above described local leakage detection may also include monitoring fuel inlet valves 150 due to a damaged valve housing 151 or fuel feeding via cables 310. In particular, if fuel is leaking out of fuel inlet valve 150 due to a damaged valve housing 151 and, referring to the embodiment of FIG. 8, due to a damaged inner casing wall 145, or due to damaged cable bushings in the inner and/or the outer barrier wall 171, 171', 172, 172' which feed fuel along cables 310, the leakage may also be detected, because the high pressure inert gas may also be provided in leakage detection space 141 and leakage detection space 173. Consequently, a pressure deviation, for example, a pressure drop, in at least one of leakage detection spaces 141, 173 may be also transmitted to pressure sensor 230 by use of leakage detection space 141 connected to leakage detection space 113 via casing leakage detection opening 114 and leakage detection space 173 connected to leakage detection space 141 via first valve leakage detection opening 152, respectively. Accordingly, fuel inlet valves 150 may also be monitored with respect to leaking fuel.

Further, due to a cast-on inlet valve casing 143, 143', manufacturing of cylinder head 140, 140' may be easy and a high precision production of which when inlet valve casing is made as a separate component to be connected to cylinder head main body 149 can be avoided. Further, due to the cast-on inlet valve casing 143, the stability of cylinder head 140, 140' may be enhanced.

In an aspect of the present disclosure, a cylinder head for an internal combustion engine may comprise a cylinder head main body and an inlet valve casing configured to house at least partly a fuel inlet valve, wherein the inlet valve casing is integrally formed with the cylinder main body.

In an embodiment, the inlet valve casing may be casted on the cylinder main body.

In an embodiment, the inlet valve casing may be configured to define a leakage detection space between an inner surface thereof and the fuel inlet valve.

In an embodiment, the inlet valve casing may comprise a housing outer wall and a housing inner wall, the housing outer wall and the housing inner wall defining a leakage detection space there between.

In an embodiment, the leakage detection space may have a closed end face and an open end face.

In an embodiment, the inlet valve casing may be configured to be connectable to a double-walled fuel supply pipe system such that the open end face is fluidly connected to an inter-space defined by an outer pipe and an inner pipe of the double-walled fuel supply pipe system.

In an embodiment, the inlet valve casing may have a casing through hole for guiding at least one cable from the fuel inlet valve to an outside of the cylinder head.

In an embodiment, a bushing may be arranged in the casing through hole, the bushing extending from the outside of the cylinder head at least partly into the fuel inlet valve.

In an embodiment, the cylinder head may further comprise a fuel inlet valve disposed within the inlet valve casing.

In an aspect of the present disclosure, a double-walled fuel supply pipe element configured to be used in a fuel supply pipe system for selectively supplying fuel such as gas or liquid fuel, for example, diesel, to an internal combustion engine, the double-walled fuel supply pipe element may comprise an inner pipe, an outer pipe, a first end face element connecting the outer pipe and the inner pipe at a first end and a second end face element connecting the outer pipe and the inner pipe at a second end opposite to the first end. The outer pipe, the inner pipe, the first end face element and the second end face element may define a leakage detection space there between and the second end face element may have a pipe element leakage detection opening connecting the leakage detection space with the outside of the double-walled fuel supply pipe element.

In an embodiment, the first end face and the second end face may be integrally formed with the outer pipe and/or the inner pipe.

In an embodiment, the first end face element and the second end face element may be separately formed with the outer pipe and the inner pipe.

In an embodiment, the first end face element and the second end face element may be formed as flanges mounted to the outer pipe and/or the inner pipe.

In an embodiment, the inner pipe and the outer pipe may comprise a cylinder head section for forming a substantially T-shaped double-walled fuel supply pipe element.

In an embodiment, the double-walled fuel supply pipe element may further comprise a third end face element at the cylinder head section, the third end face element having at least one casing leakage detection opening connecting the leakage detection space to the outside of double-walled fuel supply pipe element.

In an embodiment, the double-walled fuel supply pipe element may further comprise at least one fixing hole for fixing a further double-walled fuel supply pipe element.

In an embodiment, the inner pipe and the outer pipe are casted.

In an embodiment, the double-walled fuel supply pipe element may further comprise at least one double-walled bellow element arranged between the first end face element and the a second end face element, the double-walled bellow element including an inner bellow and an outer bellow, the outer bellow and the inner bellow defining a bellow leakage detection space there between, wherein the leakage detection space is connected with the bellow leakage detection space.

In an embodiment, the double-walled bellow element may be spaced from the first end face element and/or the second end face element at a distance of least about 10 mm, for example at least about 20 mm, 30 mm, 40 mm, 50 mm, 75 mm or 100 mm.

In an embodiment, the double-walled bellow element may integrally formed with the inner pipe and/or the outer pipe.

In an embodiment, the double-walled bellow element may be welded or moulded to the inner pipe and/or the outer pipe.

In an embodiment, the double-walled bellow element may have a first bellow flange at a first end and a second bellow flange at a second end, the first and the second bellow flanges being integrally formed, for example welded or moulded, with the inner pipe and/or the outer pipe.

In an embodiment, the double-walled bellow element may have a first bellow flange at a first end and a second bellow flange at a second end, the first bellow flange being mounted to a first mounting flange and the second bellow flange being mounted to a second mounting flange, the first and the second mounting flanges being arranged at the inner pipe and the outer pipe.

In an embodiment, the first bellow flange may be mounted to a first mounting flange and the second bellow flange may be mounted to a second mounting flange by use of at least one fastening means.

In an aspect of the present disclosure, a fuel inlet valve for an internal combustion engine may comprise a housing, a housing through hole provided in a wall of the housing for receiving power supply cables, wherein a barrier element may be arranged in the housing through hole for sealing the housing through hole, the barrier element comprising a valve leakage detection space between a first inner barrier wall and a second outer barrier wall. The fuel inlet valve may further comprise a first valve leakage detection opening integrated in the wall of the housing and fluidly connecting the valve leakage detection space with an outside of the fuel inlet valve.

In an embodiment, the first valve leakage detection opening may extend obliquely in the housing.

In an embodiment, the barrier element may be air-tightly arranged in the housing through hole.

In an embodiment, the housing through hole may comprises at least a first housing through hole portion and a second housing through hole portion, which are perpendicularly arranged to each other, the barrier element being arranged in the second housing through hole portion.

In an embodiment, the second housing through hole portion may comprise a first diameter portion and a second diameter portion, the first diameter portion being larger than the second diameter portion.

In an embodiment, the first housing through hole portion may be closed against the outside of fuel inlet valve by use of a nut being configured to guide at least one cable there through.

In an aspect of the present disclosure, a cylinder head for an internal combustion engine may comprise an inlet valve casing configured to house at least partly a fuel inlet valve and to define a leakage detection space between an inner surface thereof and a fuel inlet valve as described above. The leakage detection space of the inlet valve casing may be connected to the leakage detection space of the barrier element via the first valve leakage detection opening.

In a further aspect of the present disclosure, a cylinder head for an internal combustion engine may comprise an inlet valve casing including a outer casing wall and an inner casing wall, the outer casing wall and the inner casing wall defining a leakage detection space there between and the inner casing wall having a second valve leakage detection opening and being configured to house at least partly the fuel inlet valve as described above. The leakage detection space of the inlet valve casing may be connected to the leakage detection space of the barrier element via the second valve leakage detection opening and the first valve leakage detection opening.

In an embodiment, the inlet valve casing may have a casing through hole for guiding at least one cable from the fuel inlet valve to an outside of the cylinder head.

In an embodiment, a bushing may be arranged in the casing through hole of the inlet valve casing, the bushing extending from the outside of the cylinder head at least partly into the housing through hole of the housing of the fuel inlet valve for protecting the at least one cable.

In an embodiment, the casing through hole of the inlet valve casing may be arranged opposite the housing through hole in the housing of the fuel inlet valve when mounted in the cylinder head.

In an embodiment, the bushing may have the same cross section as the housing through hole.

In an embodiment, the inlet valve casing may be casted on the cylinder head.

In an aspect of the present disclosure, an internal combustion engine may comprise a cylinder head as described above.

In a further aspect of the present disclosure, a method for detecting a leakage in a fuel supply system of an internal combustion engine, wherein the fuel supply system comprises a fuel line system with fuel line sections and a pressure monitoring system with monitoring segments associated with the fuel line sections, a set of valves for fluidly separating neighbouring monitoring segments, and a pressure sensor fluidly connected to one of the monitoring segments comprises the steps of: performing a first pressure measurement of a pressure within the pressure monitoring system having the set of valves opened to connect fluidly the monitoring segments to be monitored with the pressure sensor; detecting a change in pressure caused by a leakage between the fuel line section and the pressure monitoring system; performing at least one further pressure measurement for a selected set of fluidly connected monitoring segments for providing pressure behaviour information for two sets of fluidly connected monitoring segments that differ in size by one monitoring segment; and identifying the leaking monitoring segment based on the comparison of the pressure behaviour information of the two sets of fluidly connected monitoring segments that differ in size by one monitoring segment.

Although the preferred embodiments of this invention have been described herein, improvements and modifications may be incorporated without departing from the scope of the following claims.

The invention claimed is:

1. A method for detecting a leakage in a fuel supply system of an internal combustion engine, wherein the fuel supply system has a fuel line system with a plurality of fuel line sections and a pressure monitoring system with a plurality of monitoring segments associated with the fuel line sections, a set of valves for fluidly separating neighboring monitoring segments of the plurality of monitoring segments, and a pressure sensor fluidly connected to at least one of the monitoring segments, the method comprising:
   opening the set of valves to fluidly connect the neighboring monitoring segments;
   detecting a leakage between the fuel line sections and the pressure monitoring system when the set of valves are opened to fluidly connect the monitoring segments;
   sensing, by the pressure sensor, a change in pressure of the pressure monitoring system caused by the detected leakage;
   selectively closing one or more of the valves based on the sensed change in pressure of the pressure monitoring system;
   performing at least two pressure measurements for at least two selected sets of neighboring monitoring segments for providing pressure behaviour information for the at least two selected sets of neighboring monitoring segments;
   comparing the pressure behaviour information of the at least two selected sets of neighboring monitoring segments; and
   identifying a leaking monitoring segment based on the comparison.

2. The method according to claim 1, wherein performing at least two pressure measurements includes:
   activating a first valve of the set of valves to provide a first separation of the monitoring segments into a first pressure monitored subset of the monitoring segments fluidly connected to the pressure sensor and a first remote subset of the monitoring segments fluidly disconnected from the pressure sensor; and
   monitoring a pressure within the first pressure monitored subset of the monitoring segments, and upon detecting a continued change in pressure or a constant pressure, associating the first pressure monitored subset of the monitoring segments or the first remote subset of the monitoring segments to be the leaking monitoring segment.

3. The method according to claim 2, wherein performing at least two pressure measurements further includes:
   activating a second valve of the set of valves such that one of the first pressure monitored subset and the first remote subset of the monitoring segments including the leaking monitoring segment is reduced by at least one monitoring segment to provide a second separation of the monitoring segments into a second pressure monitored subset fluidly connected to the pressure sensor and a second remote subset fluidly disconnected from the pressure sensor;
   monitoring a pressure within the second pressure monitored subset of the monitoring segments; and
   identifying, based on the detected pressure behaviour of the first and the second separations, the leaking monitoring segment.

4. The method according to claim 1, wherein performing at least two pressure measurements further includes performing a sequence of pressure measurements for differing sets of the monitoring segments being fluidly connected to the pressure sensor, wherein a number of the monitoring segments fluidly connected to the pressure sensor decreases with each measurement, until the leaking monitoring segment is identified.

5. The method according to claim 1, wherein performing at least two pressure measurements further includes performing a sequence of pressure measurements for differing sets of the monitoring segments being fluidly connected to the pressure sensor, wherein the number of the monitoring segments fluidly connected to the pressure sensor increases with each measurement, until the leaking monitoring segment is identified.

6. The method according to claim 1, wherein detecting a leakage includes detecting a presence of fuel in the pressure monitoring system caused by the leakage between the fuel line sections and the pressure monitoring system by a fuel detection sensor fluidly connected to at least one of the monitoring segments.

7. The method according to claim 6, further including evacuating the pressure monitoring system having the set of valves opened.

8. The method according to claim 6, further including supplying air to a first end of the pressure monitoring system having the set of valves opened and exhausting the supplied air from a second end of the pressure monitoring system, the fuel detection sensor being provided proximate to the second end of the pressure monitoring system.

9. The method according to claim 6, further including circulating air or gas through the pressure monitoring system having the set of valves opened to fluidly connect the monitoring segments to be monitored with the fuel detection sensor.

10. The method according to claim 8, further including generating at least one of a negative pressure and a low pressure in the pressure monitoring system.

11. The method according to claim 1, wherein detecting a leakage includes detecting a change in pressure caused by the leakage between the fuel line sections and the pressure monitoring system.

12. A fuel supply system for an internal combustion engine, the fuel supply system comprising:
   a fuel line system with a plurality of fuel line sections; and
   a pressure monitoring system with a plurality of monitoring segments associated with the fuel line sections, a set of valves for fluidly separating neighbouring monitoring segments of the plurality of monitoring segments, and a pressure sensor fluidly connected to at least one of the monitoring segments,
     wherein the pressure monitoring system is configured to selectively fluidly connect different sets of the monitoring segments to the pressure sensor,
     wherein the fuel line system and the pressure monitoring system include a fuel supply pipe system of a plurality of double-walled fuel supply pipe sections, each having an inner pipe and an outer pipe, wherein the inner pipe is configured for guiding fuel therein,
one or more inter-spaces between the inner pipe and the outer pipe are associated with at least one of the monitoring segments, and
wherein at least one of the double-walled fuel supply pipe sections includes at least one of a T-shaped pipe element, a linear shaped pipe element, a linear shaped pipe element with a double-walled bellow element, and a cylinder head including a cast-on casing configured to at least partly house a fuel inlet valve and to define an inlet valve leakage detection space between an inner surface of the east-on casing and the fuel inlet valve.

13. The fuel supply system according to claim 12, wherein the pressure monitoring system further includes an inert gas supply pipe system that is fluidly connected to the pressure sensor and the one or more inter-spaces between the inner pipe and the outer pipe of the double-walled fuel supply pipe sections and the inert gas supply pipe system being configured to be dividable into multiple sections via the set of valves.

14. The fuel supply system according to claim 12, wherein at least one of the double-walled fuel supply sections includes two fuel supply pipe elements having their inter-spaces fluidly connected for defining a leakage detection space.

15. The fuel supply system according to claim 12, wherein at least one of the double-walled fuel supply sections further includes a fuel inlet valve mounted in a cylinder head, the fuel inlet valve including a housing,
a housing through hole provided in the housing for feeding an electrical power supply and a control connection there through,
a barrier element arranged in the housing through hole for fluidly blocking the housing through hole and including a feed through leakage detection space, and
a fluid connection of the feed through leakage detection space with the remaining leakage detection space of the at least one of the double-walled fuel supply sections.

16. The fuel supply system according to claim 12, further including:
a fuel detection sensor fluidly connectable to at least one of the monitoring segments;
a fuel suction device fluidly connectable to the pressure monitoring system to draw air or a mixture of air and fuel from the pressure monitoring system;
a shut-off valve for fluidly separating the fuel suction device from the pressure monitoring system; and
an air or gas supply pipe configured for selectively supplying air or gas to the pressure monitoring system.

17. The fuel supply system according to claim 16 wherein the fuel suction device is one or more of a vacuum pump for evacuating the pressure monitoring system, and an exhauster, an exhaust fan, a fan, or a blower for creating a flow of air or gas in the pressure monitoring system.

18. A method for detecting a leakage in a fuel supply system of an internal combustion engine, wherein the fuel supply system has a control unit, a fuel line system with a plurality of fuel line sections, and a pressure monitoring system with a plurality of monitoring segments associated with the fuel line sections, a set of valves for fluidly separating neighboring monitoring segments of the monitoring segments, and a pressure sensor fluidly connected to at least one of the monitoring segments and connected to the control unit, the method comprising:
directing, by the control unit the set of valves to open to fluidly connect the monitoring segments;
sensing, by the pressure sensor, a change in pressure of the pressure monitoring system caused by a leakage between the fuel line sections and the pressure monitoring system;
sending, by the pressure sensor, one or more signals based on the change in pressure to the control unit;
selectively directing, by the control unit, one or more of the valves to close;
performing, by the pressure sensor, at least two pressure measurements for at least two selected sets of neighboring monitoring segments for providing pressure behaviour information for the at least two selected sets of neighboring monitoring segments;
providing the behaviour information to the control unit;
identifying, by the control unit, a leaking monitoring segment based on the behaviour information.

* * * * *